(12) United States Patent
Jindal et al.

(10) Patent No.: US 11,693,857 B1
(45) Date of Patent: Jul. 4, 2023

(54) MANAGED TUNING FOR DATA CLOUDS

(71) Applicant: Keebo Inc., Ypsilanti, MI (US)

(72) Inventors: Alekh Jindal, Sammamish, WA (US);
Barzan Mozafari, Ypsilanti, MI (US);
Yongjoo Park, Champaign, IL (US);
David Wolfgang Grömling, Frankfurt am Main (DE); Brian Westphal, Ypsilanti, MI (US); Alan D. Cabrera, San Francisco, CA (US)

(73) Assignee: Keebo Inc., Ypsilanti, MI (US)

( * ) Notice: Subject to any disclaimer, the term of this patent is extended or adjusted under 35 U.S.C. 154(b) by 0 days.

(21) Appl. No.: 17/846,813

(22) Filed: Jun. 22, 2022

(51) Int. Cl.
*G06F 15/16* (2006.01)
*G06F 16/2453* (2019.01)
*G06F 16/21* (2019.01)

(52) U.S. Cl.
CPC ...... *G06F 16/24545* (2019.01); *G06F 16/217* (2019.01)

(58) Field of Classification Search
None
See application file for complete search history.

(56) References Cited

U.S. PATENT DOCUMENTS

| | | | | |
|---|---|---|---|---|
| 11,366,598 | B1* | 6/2022 | Goyal | G06F 3/064 |
| 11,411,815 | B1* | 8/2022 | Shrestha | H04L 41/0816 |
| 2010/0223253 | A1* | 9/2010 | Gopal | G06F 16/217 |
| | | | | 707/E17.014 |
| 2015/0248462 | A1* | 9/2015 | Theeten | G06F 16/24524 |
| | | | | 707/688 |
| 2017/0031986 | A1* | 2/2017 | Li | G06F 16/24542 |
| 2017/0316078 | A1 | 11/2017 | Funke et al. | |
| 2022/0043822 | A1* | 2/2022 | Möhler | G06F 16/256 |

* cited by examiner

*Primary Examiner* — Alex Gofman
(74) *Attorney, Agent, or Firm* — Anand P Narayan; Yantra Patents LLC

(57) ABSTRACT

Implementations described herein relate to systems and methods to configure a data warehouse system. In some implementations, a method includes obtaining, by a configuration management system, historical query workload metadata associated with a data warehouse from the data warehouse system, determining, a first configuration setting associated with a configurable parameter for a first time period, wherein the first configuration setting is associated with a computing resource utilization at the data warehouse system different from a previous configuration setting, transmitting, to the data warehouse system, the first configuration setting for the configurable parameter, receiving, from the data warehouse system, during the first time period, query workload metadata, determining, whether the query workload metadata meets a threshold performance, and based on a determination that the query workload metadata does not meet the threshold performance, transmitting a backoff configuration setting for the configurable parameter to the data warehouse system.

20 Claims, 13 Drawing Sheets

| | Instance 1 | Instance 2 |
|---|---|---|
| Query ID | 1 | 2 |
| Start Time | 101 | 201 |
| Execution Time | 50 | 75 |
| Execution Status | Success | Failure |
| Cluster Number | 1 | 4 |
| Warehouse Size | Large | Small |
| Queued Overload Time | 15 | 5 |

Query Workload Metadata 400

FIG. 4

MANAGED TUNING FOR DATA CLOUDS

TECHNICAL FIELD

Embodiments relate generally to configuration management of data warehouse configuration parameters, and particularly to dynamic tuning of data warehouse configuration parameters.

BACKGROUND

Modern data clouds provide a managed data warehousing experience where users can quickly build their business intelligence applications and dashboards, while data cloud providers and distributed computing vendors take care of provisioning and scaling the data processing infrastructure on demand. Unfortunately, these data clouds are general purpose and are not optimized for the customer workloads at hand. In fact, data warehousing workloads have become too complex for customers to understand or tune manually. Prior on-prem database tuning tools relied on expert database administrators to identify bottlenecks, derive and apply the tuning decisions, monitor and roll them back in case of degradation, and constantly evolve the entire process over time. This is either too cumbersome or simply infeasible for modern data clouds.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method to configure a data warehouse system. The computer-implemented method also includes obtaining, by a configuration management system, historical query workload metadata associated with a data warehouse from the data warehouse system; determining, based on the historical query workload metadata, a first configuration setting associated with a configurable parameter for a first time period, where the first configuration setting is associated with a lower computing resource utilization at the data warehouse system when compared to a previous configuration setting. The method also includes transmitting, to the data warehouse system, the first configuration setting for the configurable parameter; receiving, from the data warehouse system, during the first time period, query workload metadata; determining, based on the query workload metadata, whether the query workload metadata meets a threshold performance; and based on a determination that the query workload metadata does not meet the threshold performance, transmitting a backoff configuration setting for the configurable parameter to the data warehouse system. Other embodiments of this aspect include corresponding computer systems, apparatus, and computer programs recorded on one or more computer storage devices, each configured to perform the actions of the methods.

Implementations may include one or more of the following features. The computer-implemented method where the configurable parameter is an auto-suspend interval, and where determining the first configuration setting for the auto-suspend interval for the first time period may include: determining a plurality of time intervals between a time of completion of a first query and a time of arrival of a second query that immediately follows the first query for queries included in the historical query workload metadata; and setting the first configuration setting to a minimum auto-suspend interval where a number of affected queries meets an affected queries threshold, where an affected query is a query with an associated time interval that exceeds a corresponding auto-suspend interval. The affected queries threshold is based on an aggressiveness index and a default affected queries threshold, and where the default affected queries threshold is based on a number of affected queries associated with a default auto-suspend interval. The computer-implemented method may include receiving at the configuration management system via a user interface, an aggressiveness index for one or more data warehouses that includes the data warehouse. The configurable parameter is a warehouse size for a data warehouse, and where determining the first configuration setting for the warehouse size for the first time period may include: determining a plurality of query latencies for queries included in the historical query workload metadata; determining a plurality of time window specific threshold percentile latencies that correspond to a predetermined threshold percentile of query latencies of the plurality of query latencies for queries that were processed by the data warehouse system during a corresponding time window of a plurality of time windows in the historical query workload metadata; determining a reference threshold percentile latency that is based on a predetermined threshold percentile of the plurality of time window specific threshold percentile latencies; and setting the first configuration setting to a specified setting of a plurality of specified settings if the time window specific threshold percentile latency for the first time period is less than the reference threshold percentile latency, where the specified setting is lower than the previous configuration setting. A number of received queries in each of the plurality of time windows meets a threshold number of received queries. The configurable parameter is a maximum number of warehouse clusters per data warehouse, and where determining the first configuration setting for the first time period may include: determining a plurality of time window specific threshold percentile maximum cluster counts that correspond to a predetermined threshold percentile of maximum cluster counts for queries that were processed by the data warehouse system during a corresponding time window in the historical query workload metadata; determining a plurality of query latencies for queries included in the historical query workload metadata; determining a plurality of time window specific threshold percentile latencies that correspond to a predetermined threshold percentile of query latencies of the plurality of query latencies for queries that were processed by the data warehouse system during a corresponding time window in the historical query workload metadata; determining a reference threshold percentile latency that is based on a predetermined threshold percentile of the plurality of time window specific threshold percentile latencies; and determining the first configuration setting by: decrementing the time window specific threshold percentile maximum cluster count if the time window specific threshold percentile latency for the first time period is less than the reference threshold percentile latency; and setting the first configuration setting to the time window specific threshold percentile maximum cluster count if the time window specific threshold percentile latency for the first time period is greater than or equal to the reference threshold percentile latency. Determining the reference threshold percentile latency further may include determining the reference threshold percentile latency based on an aggressiveness index associated with the data warehouse, and where the aggressiveness index is received at the configuration management system via a user interface. The backoff configuration setting is the previous configuration setting. The backoff configuration setting is a determined value for the configurable parameter that lies between the first configuration setting and the previous configuration setting. The computer-implemented method may include determining a cost savings of the data warehouse when operating at the first configuration setting when compared to operating at the previous configuration setting. The computer-implemented method may include displaying, on a user interface of a user of the data warehouse, the cost savings of the data warehouse. The computer-implemented method may include: determining a second configuration setting for a second time period; and transmitting, to the data warehouse system and prior to commencement of the second time period, the second configuration setting. At least one of the first configuration setting and the second configuration setting is associated with a lower computing resource usage when compared to the previous configuration setting. Implementations of the described techniques may include hardware, a method or process, or computer software on a computer-accessible medium.

The non-transitory computer-readable medium also includes obtaining historical query workload metadata associated with a data warehouse from a data warehouse system. The medium also includes determining, based on the historical query workload metadata, a first configuration setting associated with a configurable parameter for a first time period, where the first configuration setting is associated with a different computing resource utilization at the data warehouse system when compared to a previous configuration setting. The medium also includes transmitting, to the data warehouse system, the first configuration setting for the configurable parameter; receiving, from the data warehouse system, during the first time period, query workload metadata; determining, whether the query workload metadata meets a threshold performance; and based on a determination that the query workload metadata does not meet the threshold performance, transmitting a backoff configuration setting for the configurable parameter to the data warehouse system. Other embodiments of this aspect include corresponding computer systems, apparatus, and computer programs recorded on one or more computer storage devices, each configured to perform the actions of the methods.

Implementations may include one or more of the following features. The non-transitory computer-readable medium where the configurable parameter is an auto-suspend interval, and where determining the first configuration setting for the auto-suspend interval for the first time period may include: determining a plurality of time intervals between query arrival times for queries included in the historical query workload metadata; and setting the first configuration setting to a minimum auto-suspend interval of a plurality of specified auto-suspend intervals where a number of affected queries meets an affected queries threshold, where an affected query is a query with an associated time interval that exceeds a corresponding auto-suspend interval of the plurality of specified auto-suspend intervals. The configurable parameter is a warehouse size for the data warehouse, and where determining the first configuration setting for the warehouse size for the first time period may include: determining a plurality of query latencies for queries included in the historical query workload metadata; determining a plurality of time window specific threshold percentile latencies that correspond to a predetermined threshold percentile of query latencies of the plurality of query latencies for queries that were processed by the data warehouse system during a corresponding time window in the historical query workload metadata; determining a reference threshold percentile latency that is based on a predetermined threshold percentile of the plurality of time window specific threshold percentile latencies; and setting the first configuration setting to a specified setting of a plurality of specified settings if the time window specific threshold percentile latency for the first time period is less than the reference threshold percentile latency, where the specified setting is lower than the previous configuration setting. Implementations of the described techniques may include hardware, a method or process, or computer software on a computer-accessible medium.

The system also includes a memory with instructions stored thereon; and a processing device, coupled to the memory, the processing device configured to access the memory and execute the instructions, where the instructions cause the processing device to perform operations including: The system also includes obtaining historical query workload metadata associated with a data warehouse from a data warehouse system; determining, based on the historical query workload metadata, a first configuration setting associated with a configurable parameter for a first time period, where the first configuration setting is associated with a different computing resource utilization at the data warehouse system when compared to a previous configuration setting. The system also includes transmitting, to the data warehouse system, the first configuration setting for the configurable parameter; receiving, from the data warehouse system, during the first time period, query workload metadata; determining, whether the query workload metadata meets a threshold performance; and based on a determination that the query workload metadata does not meet the threshold performance, transmitting a backoff configuration setting for the configurable parameter to the data warehouse system. Other embodiments of this aspect include corresponding computer systems, apparatus, and computer programs recorded on one or more computer storage devices, each configured to perform the actions of the methods.

Implementations may include one or more of the following features. The system where the backoff configuration setting is the previous configuration setting. The configurable parameter is a number of warehouse clusters for the data warehouse, and where determining the first configuration setting for the first time period may include: determining a plurality of time window specific threshold percentile maximum cluster counts that correspond to a predetermined threshold percentile of maximum cluster counts for queries that were processed by the data warehouse system during a corresponding time window in the historical query workload metadata; determining a plurality of query latencies for queries included in the historical query workload metadata; determining a plurality of time window specific threshold percentile latencies that correspond to a predetermined threshold percentile of query latencies of the plurality of query latencies for queries that were processed by the data warehouse system during a corresponding time window in the historical query workload metadata; determining a reference threshold percentile latency that is based on a predetermined threshold percentile of the plurality of time window specific threshold percentile latencies; and determining the first configuration setting by: decrementing the time window specific threshold percentile maximum cluster count if the time window specific threshold percentile latency for the first time period is less than the reference threshold percentile latency; and setting the first configuration setting to the time window specific threshold percentile maximum cluster count if the time window specific threshold percentile latency for the first time period is greater than or equal to the reference threshold percentile latency. Implementations of the described techniques may include hardware, a method or process, or computer software on a computer-accessible medium.

BRIEF DESCRIPTION OF THE DRAWINGS

FIG. 4 depicts example query workload metadata, in accordance with some implementations.

DETAILED DESCRIPTION

Figure 1:
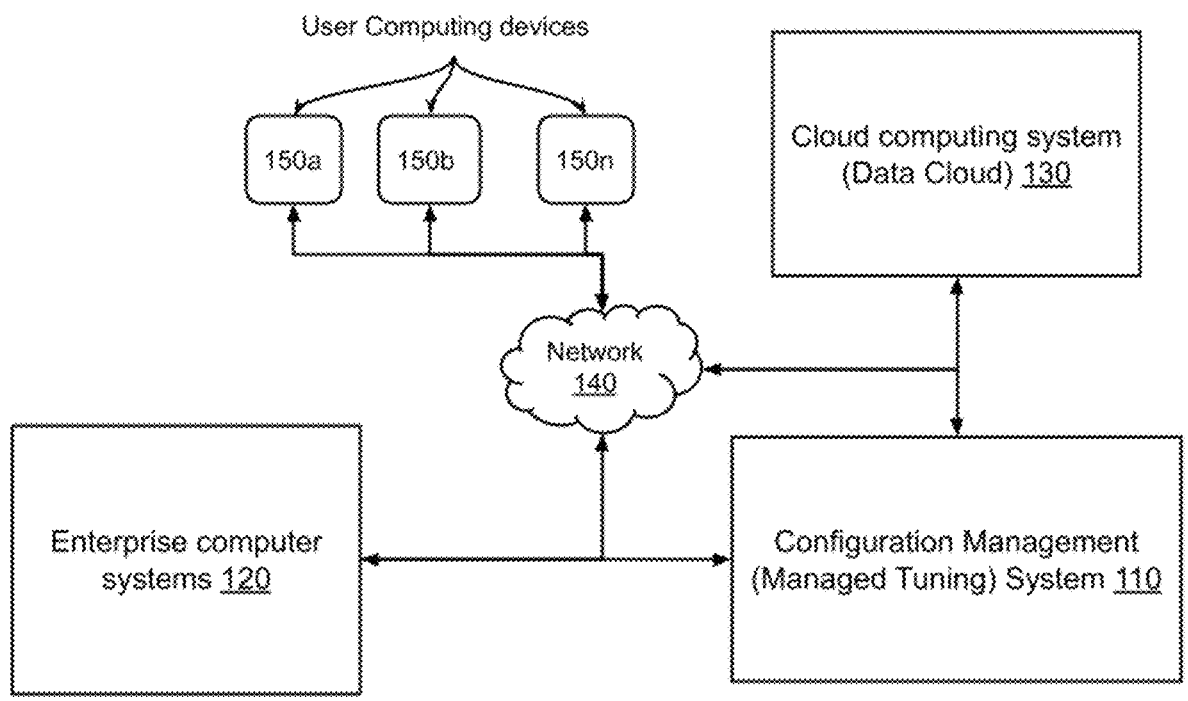
FIG. 1 depicts an example system environment, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Similarly, references in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same embodiment or implementation. Further, when a particular feature, structure, or characteristic is described in connection with an embodiment, such feature, structure, or characteristic may be implemented in connection with other embodiments whether or not explicitly described.

Data warehouses, also referred to as enterprise data warehouses, are systems used for reporting and data analysis and considered to be a key component of business intelligence systems. Data warehouses serve as central repositories of integrated data from one or more disparate sources, e.g., transactional computer systems, customer relationship management (CRM) systems, enterprise resource planning (ERP) systems, etc., to store and provide access to current and historical data that are used for creating analytical reports for users (e.g. employees) throughout an enterprise.

The data stored in the warehouse is uploaded from the operational systems (such as marketing or sales). A data warehouse is a type of data management system that is designed to enable and support business intelligence (BI) activities, especially analytics. Data warehouses are extensively utilized to perform queries and analysis and often contain large amounts of historical data. The data within a data warehouse can be derived from a wide range of sources such as application log files and transaction applications. A typical data warehouse has four main components: a central database, ETL (extract, transform, load) tools, metadata, and access tools. A data warehouse centralizes and consolidates large amounts of data from multiple sources. Its analytical capabilities allow organizations to derive valuable business insights from their data to improve decision-making. A historical record is maintained that can be utilized by data scientists and business analysts.

Historically, data warehouses were built with on-premises (on-prem) servers. These on-premises data warehouses continue to have advantages today. In many cases, they can offer improved governance, security, data sovereignty, and better latency. However, on-premises data warehouses are not as elastic and they require complex forecasting to determine how to scale the data warehouse for future needs. Managing these data warehouses can also be very complex.

However, more recently, the use of cloud data warehouses is becoming prevalent. A cloud data warehouse (virtual data warehouse) uses the cloud to ingest and store data from disparate data sources. Cloud data warehouses provide advantages such as increased elasticity, with scalability support for large or variable compute and/or storage requirements, cost savings, and ease of use.

Most cloud data warehouses are fully managed by a provider of a data warehouse system, (cloud data), are self-driving, and enable easy access to enable users to create and use the data warehouse. Most cloud data warehouses support and follow a pay-as-you-go model, which brings added cost savings to customers.

Tuning configuration parameters (knobs) is critical for achieving high performance in database systems. In a typical Data as a Service (DaaS) system, tuning of databases is performed by the data warehouse system provider. The tuning may be performed for any of hundred or more parameters (internal knobs) associated with the database systems.

However, one or more configurable parameters (external knobs) may be exposed to the enterprise user, which have a direct bearing on both performance and/or cost. Tuning of the external knobs is a critical technical operation that has to take into account the performance specifications to be met, cost considerations, relative priority of one or more data warehouses, seasonality and/or variability of traffic (query) loads, etc. The enterprise user, or alternatively, a configuration management system provider providing a managed tuning service, can utilize the exposed configurable parameters to allocate compute resources, augment compute resources, shutdown (suspend) compute services, etc.

Managed Tuning (Configuration Management System for Data Warehouses)

This disclosure describes managed tuning for data clouds. A data cloud tuning software as a service (SaaS) is disclosed that plugs into existing data cloud infrastructure, identifies various optimization decisions, and manages their end to end lifecycle.

The Configuration Management System can connect to users' existing data cloud and analyze their workloads at hand; use past workloads to tune the future behavior of data clouds; dynamically adjust the auto suspend values of the data warehouses; dynamically adjust the warehouse size; dynamically adjust the maximum number of warehouse clusters; optimize the data warehouse system without increasing the number of queued queries (or other performance metrics) in the warehouse; segregate workloads into slow and fast intervals and optimize them differently; create predictive schedules for optimization decisions and automatically apply them; refine the optimization decisions incrementally by constantly factoring new workloads; control the aggressiveness of the optimizations to tradeoff performance versus cost; provide a unification for all optimizations with a single aggressiveness slider; automatically backoff the optimization in real time if the performance (could be queuing, latency, throughput etc.) degrades; estimate the cost savings due to managed tunings over time; and provide value-based pricing for the optimizations provided to the customers.

The Configuration Management System can provide the features and advantages listed above with zero migration of data or workloads; be completely transparent to the data cloud users, and enable users to onboard their data warehouses in minutes and be completely hands off once enabled.

The Configuration Management System can explore the system performance at other unseen configurations by speculatively applying those configurations and recording the corresponding performance for training purposes. As a result, it can generate optimal configuration values for operating conditions that may not have been seen ever before in the past. The Configuration Management System can also apply different settings to different data warehouses to distribute the risk of unknown performance, and later reward the best setting(s) by applying it to additional warehouses. The Configuration Management System can also transfer the learnings from one query workload or data warehouse to another similar query workload or similar data warehouse without having observed the second one before, i.e., it need not build the learning models from scratch each time.

FIG. 1 depicts an example system environment, in accordance with some implementations.

FIG. 1 depicts a configuration management system 110 that may be utilized to perform managed tuning in a data cloud environment. The configuration management system 110 is connected via network 140 to one or more data cloud (data warehouse) systems 130 that provide data warehousing and other allied services to one or more users, e.g., enterprise users. The data warehousing and other services, e.g., data integration, management, storage, analytics, etc., and may also be referred to as a DaaS (Data as a Service) system.

The configuration management system is communicatively coupled to one or more enterprise computer system(s) 120 and may provide services such as monitoring and management of the computing resources utilized by the enterprise computer systems as well as their end-users.

Network 140 is any network or combination of networks of computing devices that enable devices to communicate with one another. For example, network 140 can be any one or any combination of a LAN (local area network), WAN (wide area network), telephone network, wireless network, point-to-point network, star network, token ring network, hub network, or other appropriate configuration.

The computer systems may be connected using TCP/IP and use other common Internet protocols to communicate, such as HTTP, FTP, AFS, WAP, etc. Users may access the systems by utilizing different platforms and frameworks, e.g., by using single-page client applications that use HTML and TypeScript.

One or more enterprise computer system(s) 120 represents computing devices associated with enterprise users who run applications over the network, e.g., data analytics, as well as users who may access the data cloud via respective user computing devices 150a-150n.

Both the cloud data warehouses (or the data cloud) and managed tuning are SaaS products, i.e., the users and enterprise applications (such as the business intelligence dashboards) can readily connect and start using them over the network (internet), without any local installation or setup.

Users can enable the configuration tuning system by creating user credentials, e.g., a user account, that has relevant metadata access and that can be utilized to manage the tuning lifecycle. Users are enabled, via suitable user interfaces, to selectively apply managed tuning, e.g., control which warehouses have configuration tuning enabled, and can disable managed tuning at any time. All data and query processing operations associated with the data warehouse operate similarly to how they were functioning prior to activation of managed tuning.

Figure 2:
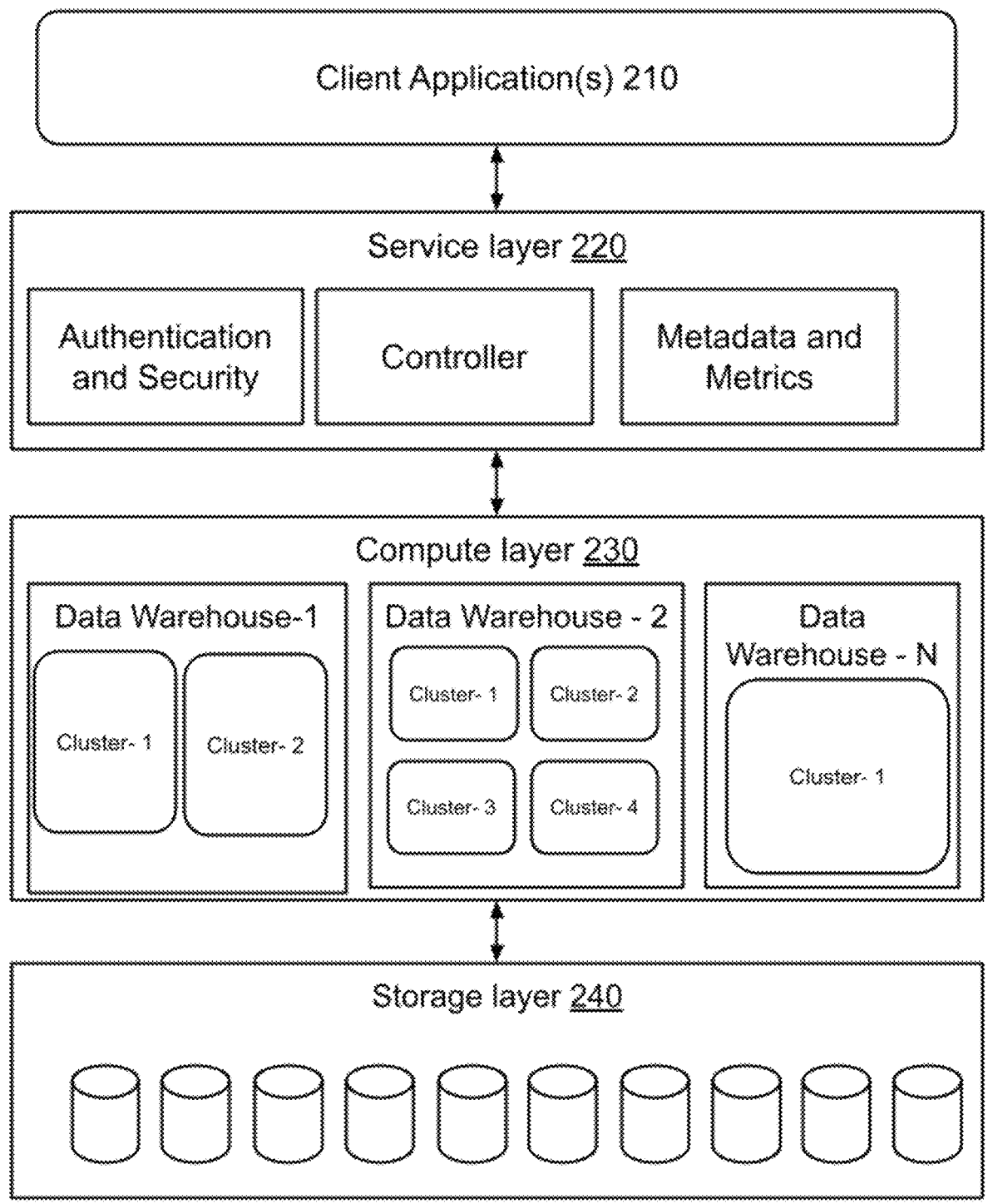
FIG. 2 depicts an example data cloud environment, in accordance with some implementations.

FIG. 2 depicts an example data cloud environment, in accordance with some implementations.

As depicted in FIG. 2, the example data cloud environment (data warehouse system) includes a client application 210 layer, a service layer 220, a compute layer 230, and a storage layer 240.

The client application layer supports one or more client applications external to the data warehouses system, and may support query processing and other uses of the data warehouse system by an enterprise user system.

The client applications may utilize an application execution environment, e.g., any software environment that supports execution of a software application. For example, an application execution environment supported herein may be an operating system (e.g., Linux, Windows, Unix, etc.), a hypervisor that supports execution of one or more virtual machines (e.g., Xen®, Oracle VM Server, Microsoft Hyper-V™, VMWare® Workstation, VirtualBox®, etc.), a virtual computer defined by a specification, e.g., a Java Virtual Machine (JVM), an application execution container (e.g., containers based on Linux CGroups, Docker, Kubernetes, CoreOS, etc.), a process executing under an operating system (e.g., a UNIX process), etc. In some implementations, the application execution environment may be a software application, e.g., that is configured to execute on server hardware.

The service layer 220 includes support for applications and infrastructure that support the services utilized over the data warehouse system, e.g., authentication and security, a controller to manage and orchestrate operations, and metadata/metric generation and storage.

The compute layer 230 provides the computing resources for processing queries received at the data warehouse system. As depicted in FIG. 2, each enterprise user client may configure one or more data warehouses.

The data warehouses may be of different sizes, and may optionally have multiple clusters associated with one or more data warehouses. A size and maximum number of clusters may be configured based on a received setting from an enterprise computer system, an enterprise user, or from a configuration management system.

The data warehouse system may support auto-scaling, and a number of clusters may be automatically increased based on auto-scaling, i.e., additional clusters may be added by the data warehouse system for a particular data warehouse based on a query queue length associated with the particular data warehouse, and thresholds specified for maximum query queue lengths.

In this illustrative example, three data warehouses of different sizes and clusters are depicted; data warehouse-1 with two clusters, data warehouse-2 with 4 clusters, and a data warehouse-N with a single cluster.

In some implementations, the number of clusters may be determined based on a setting of maximum number of clusters that is specified, e.g., by a transmission of a suitable configuration setting. A setting of maximum number of clusters may enable a user to control costs, since deployment of additional clusters are charged to the user.

The storage layer 240 includes storage devices, disk drives, solid state drives (SSD), etc, where the database data is stored.

When a query is received, it arrives via the client application layer. The service layer performs preliminary processing, including a determination of a data warehouse and compute resources to be assigned for the processing, while the compute layer performs the actual data processing of the query. Records, e.g., log files, with details of processed queries, queue lengths, other performance metrics, compute resources utilized, etc., are maintained by the data warehouse system and may be accessible by external applications.

Figure 3:
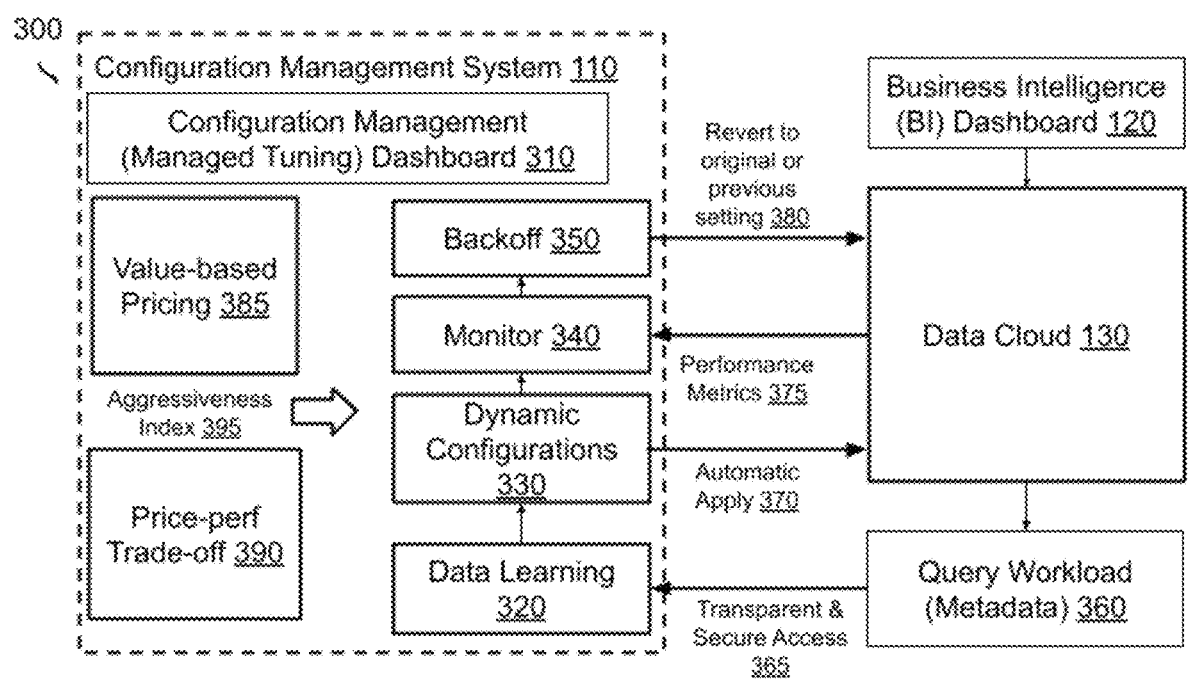
FIG. 3 depicts an example configuration management (managed tuning) system for data clouds, in accordance with some implementations.

FIG. 3 depicts an example configuration management (managed tuning) system for data clouds, in accordance with some implementations.

In some implementations, managed tuning is provided as a completely external tuning service that is a fully managed software-as-a-service (SaaS). This means that users, e.g., enterprise users, do not have to install or learn any custom tools for their optimizations. They can continue using their data clouds (data warehouse systems) as before, while the managed tuning takes care of the optimizations, helping them achieve goals such as cost savings, better performance, etc.

As depicted in FIG. 3, in an example implementation, a business intelligence (BI) dashboard may be utilized by enterprise computer systems to access a data cloud 130, e.g., to process one or more queries. The data cloud, or data warehouse system 130 performs the processing.

A configuration management system 110 may also utilize a configuration management system dashboard 310 to enable users to manage the configuration of their data warehouses.

At periodic intervals, or based on a request ('pull') from the configuration management system, query workload metadata 360 is obtained from the data warehouse system. The query workload metadata is obtained (365) in a transparent and secure manner by utilizing special authentication credentials that enable access to configure one or more parameters of the data warehouse system, but without (or with limited) access to the actual underlying data, e.g., of specific queries, enterprise proprietary data, etc.

A data learning module 320 may be utilized to determine dynamic configurations (330) which may be automatically applied (370).

Performance metrics are obtained (375) at periodic intervals, which are monitored (340). Based on the monitoring, backoff configuration settings may be applied (350), whereby confirmation settings may be reverted (380) to their default or original setting(s).

A single aggressiveness index (395) is received from an enterprise computing system, e.g., via a user interface, that is indicative of a price performance trade-off (390). In some implementations, a pricing of the configuration management may be based on a value offered to the enterprise user (385), e.g., the price may be a portion of the savings provided by the managed tuning service.

Some of the key features of managed tuning include:

Data Learning

Managed tuning creates special purpose data learning models, based on the workloads in individual customer warehouses. This means that different data cloud configurations could be chosen for different customers on different days. Furthermore, data learning separates intervals of time that have high load activity from those having low load activity and creates specialized optimization decisions for different time intervals. Data learning models improve over time and managed tuning also adds newer models progressively, all completely transparent to the users.

Dynamic Configurations

Important data cloud configurations are made dynamic. These include how long a warehouse is idle before being turned off, what is the size of a warehouse, what is the maximum number of clusters that could be used, and so on. These configurations are either set to static values by users or provided as fixed default values by the vendors, and they are critical for warehouse performance and cost. The optimal values of these configurations depend on the given user workload at hand, and given the complexity of modern cloud workloads, these configurations are hard for users to figure out and maintain on their own.

Automatic Monitor & Backoff

In addition to automatically deciding and applying the optimizations, managed tuning also takes care of automatically backing off when the performance degrades, i.e., it monitors the warehouse performance and checks whether more queries get queued than normal or whether more queries get queued than a specified threshold number of queries. In that case, the optimization decision is rolled back temporarily before an attempt is made to apply it again.

Optimization Lifecycle

Once connected, managed tuning covers the entire optimization life cycle which includes observing the workloads, applying data learning to extract the workload characteristics, making the various optimization decisions, scheduling those decisions for future workloads, constantly applying them as per the schedule, monitoring the performance impact due to the optimizations, backing off the optimization decisions in case of adverse impact, and reporting the overall benefits to the customers.

Cost-Performance Trade-Off

Managed tuning optimizations allow a trade-off between performance and cost, i.e. users can control an aggressiveness parameter to decide how much the algorithm should lean towards cutting costs versus preserving performance. It makes sense since users typically know the importance of their workloads and whether they should be prioritizing cost or performance for different warehouses. The aggressiveness parameter is common to all algorithms such that users do not have to worry about setting the right aggressiveness for each optimization. Underneath, the configuration management system takes care of mapping an user-specified aggressiveness index to algorithmic decisions that deliver the corresponding cost-performance trade-off.

Value-Based Pricing

Managed tuning may be priced based on the value it produces, i.e, users are charged a fraction of per-unit savings produced. This pay-as-you-save goes well with the pay-as-you-go model that enterprise users are already used to in data clouds.

Warehouse Dashboard

A dashboard provides a way to observe the costs per warehouse, the savings produced by managed tuning, and the corresponding performance metrics to visualize the warehouse performance, costs incurred, and the cost-performance tradeoff in action.

FIG. 4 depicts example query workload metadata, in accordance with some implementations.

Query workload metadata 400 may be obtained from a data warehouse system, e.g., based on a pull request that specifies a duration of time that the metadata is sought for, the data fields that the data is sought for, and the set of data warehouse(s) that the metadata is sought for.

In this illustrative example, example metadata for two instances are depicted. The data fields can include a query identifier (ID), a start time for the query, a total execution time, execution status (whether successful or unsuccessful), number of clusters, warehouse size, and a duration of time that the query was queued due to an overload (e.g., due to the data warehouse processing a previous query).

In some implementations, historical query workload metadata may be obtained that includes data with overlapping time periods from different times, e.g., by obtaining data for a plurality of weeks, multiple data segments of query workload metadata from Monday mornings (if that happens to be a time period of interest and analysis) can be obtained. By contrast, query workload metadata may also be obtained that only includes select fields that may be indicative of system performance, e.g., one or more performance metrics that may directly be associated with query performance.

Figure 5:
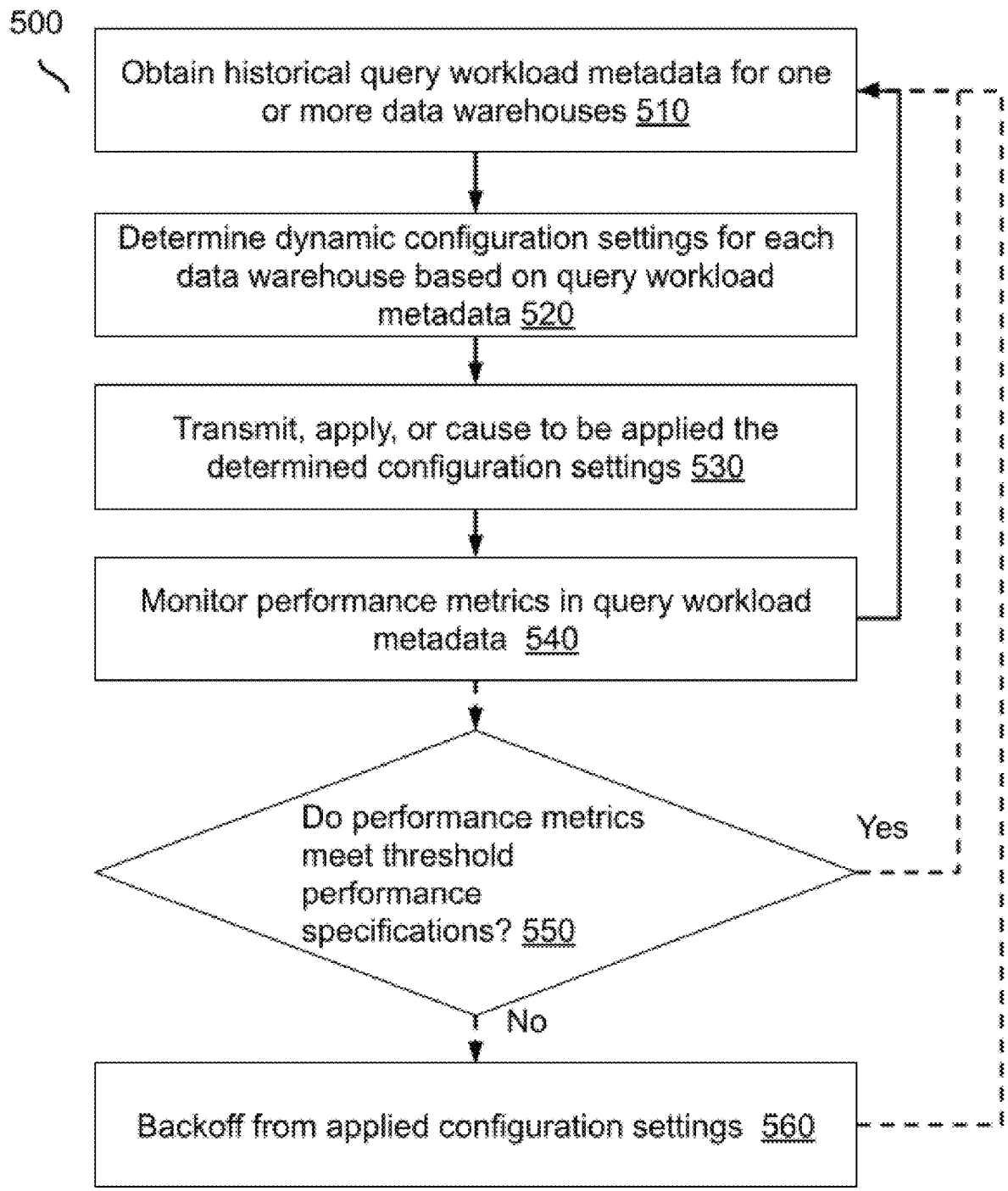
FIG. 5 depicts an example method to configure a data cloud, in accordance with some implementations.

FIG. 5 depicts an example method to configure a data cloud, in accordance with some implementations.

In some implementations, method 500 can be implemented, for example, on configuration management system 110 described with reference to FIG. 1. In some implementations, some or all of the method 500 can be implemented on one or more enterprise computer systems 120, on cloud computing system 130, as shown in FIG. 1, and/or on a combination of the systems. In the described examples, the implementing system includes one or more digital processors or processing circuitry ("processors"), and one or more storage devices. In some implementations, different components of one or more distributed computing systems (eg., cloud based systems), servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

In some implementations, the method 500, or portions of the method, can be initiated automatically by a system. In some implementations, the implementing system is a first device. For example, the method (or portions thereof) can be periodically performed, or performed based on one or more particular events or conditions, e.g., receipt of an indication from the data cloud/data warehouse system, reception of performance metric data, reception of events, notifications, and/or messages from a cloud computing system, at a predetermined time, a predetermined time period having expired since the last performance of method 500, and/or one or more other conditions or events occurring which can be specified in settings read by the method.

Processing may begin at block 510.

At block 510, historical query workload metadata associated with one or more data warehouses is received, e.g., via an application program interface (API) from the cloud storage system. In some implementations, the historical query workload metadata may be obtained by pulling, e.g., of log files based on a transmitted request to the data warehouse system from the configuration management system. The transmitted request may include details of specific metadata requested, e.g., details of queries received at each data warehouse, a time of start of processing of each query, a time of completion of processing of each query, a number of queries in a queue at each data warehouse, a number of clusters of each data warehouse, etc.

In some implementations, the historical query workload metadata may also include configuration settings of one or more configuration parameters, e.g., auto suspend interval setting (pause or idle time setting), data warehouse size, a maximum number of clusters (max cluster count) etc. In some implementations, the configuration settings may be obtained separately from the query workload metadata, e.g., via a dashboard display, via a record of configuration settings maintained at the configuration management system and/or enterprise user, via a messaging service, or via a separate request transmitted to the data warehouse system.

In some implementations, the historical query metadata is obtained for a period of time that is of sufficient duration to capture traffic dynamics, e.g., variations detected based on time of day, variations detected on day of week, season, etc. The period of time is selected such that sufficient multiple instances of each time period of interest is included in the historical query metadata. The historical query workload metadata may be processed on a sliding window basis, where a portion of data associated with the earliest time period is replaced with recent data.

In some implementations, method 500 is performed for the first time (initialized) when one or more data warehouses are at their default configuration settings, which may be specified or suggested by a data warehouse system provider and/or an enterprise user. In some implementations, method 500 may be initialized by setting one or more data warehouses to their default configuration settings. For example, one configuration management provider may replace a previously configured data warehouse, and it may be advantageous to initialize all settings to their default settings.

Block 510 may be followed by block 520.

At block 520, the historical query workload metadata for each of one or more data warehouses may be analyzed. In some implementations, the analysis is performed by providing the historical query workload metadata to a machine learning model. In some other implementations, the analysis is performed by a data learning model. The analysis may be utilized to determine one or more dynamic configuration settings to be applied for the one or more data warehouses.

In some implementations, dynamic configuration settings may be determined such that different configuration settings are applied for each data warehouse for different time periods. For example, the dynamic configuration settings may be applied such that different configuration settings are applied at different time intervals based on whether the time intervals is expected to be a high traffic/load time interval or a low traffic/load time interval The determination may be made based on patterns detected in the historical query workload metadata.

Block 520 may be followed by block 530.

At block 530, the determined configuration settings may be transmitted to the data warehouse system. In some implementations, the transmission of the configuration settings may be performed via a web browser where a corresponding configuration setting is updated on a computing device associated with the data warehouse system (e.g., cloud data provider). In some implementations, the settings may be transmitted via an API to the data warehouse system.

In some implementations, transmission of the setting(s) may cause the transmitted setting(s) to be applied at the data warehouse system and change the configuration of one or more data warehouses. For example, a size of a data warehouse may be increased in response to a transmitted configuration setting, and additional compute and storage resources subsequently allocated to a data warehouse, thereby improving computational performance. In another example, a size of a data warehouse may be decreased in response to a transmitted configuration setting, and a portion of currently allocated compute and storage resources allocated to a data warehouse may be decommissioned, thereby providing cost savings In some implementations, there may be a specified lag between updation and the setting to be applied. In such implementations, the transmission may be made taking into account the specified lag. In some implementations, an acknowledgment of the updated setting may be received, eg., by the configuration management system, by the enterprise system, or via a log that maintains a record of the settings.

Block 530 may be followed by block 540.

At block 540, performance metrics for one or more data warehouses may be monitored.

The performance metrics may be monitored by obtaining a time-slice of query workload metadata. In some implementations, the time-slice metadata utilizes the same structure and the same data fields as the historical query workload metadata; while in others a smaller dataset may be obtained. For example, only a queue length and/or a latency of queries may be monitored.

In some implementations, time-slice metadata of all data warehouses are monitored. In others, only data warehouses with updated configuration settings, e.g., one or more data warehouses for which configuration settings were transmitted to the data warehouse system, may be monitored.

Block 540 may be followed by block 550.

At block 550, it may be determined whether the performance metrics meet threshold performance specifications.

Performance metrics can include and are not limited to latency, throughput, queuing time, queue length, I/O, cluster load, and total processing time. Any one or more of the listed performance metrics can be utilized for monitoring.

If it is determined that the performance metrics do not meet the threshold performance spec, block 550 is followed by 560, else block 550 is followed by block 510.

At block 560, the configuration management system may implement a backoff from the configuration settings determined earlier, e.g., at block 520. In some implementations, the backoff may involve reverting to one or more default configuration settings, e.g., those specified by an enterprise user, specified by the data warehouse system, etc.

While method 500 has been described with reference to various blocks in FIG. 5, it may be understood that techniques described in this disclosure may be performed without performing some of the blocks of FIG. 5. In some implementations, one or more of the blocks illustrated in FIG. 5 may be combined. In various implementations, some of the blocks of method 500 may be performed in parallel or in an order different from that illustrated in FIG. 5.

Blocks 510-560 can be performed (or repeated) in a different order than described above and/or one or more steps can be omitted. For example, in some implementations, blocks 55-560 may be omitted, and in some implementations, the method may commence directly at block 520 based on previously obtained historical query workload metadata, or at block 530 based on previously determined settings for one or more configuration parameters.

In some implementations, blocks 510-560 may be performed periodically, e.g., every about 6 hours, periodically based on time periods specified by a user, etc. In some implementations, the configuration settings may be autonomously applied (or caused to be applied) by the configuration management system.

Figure 6:
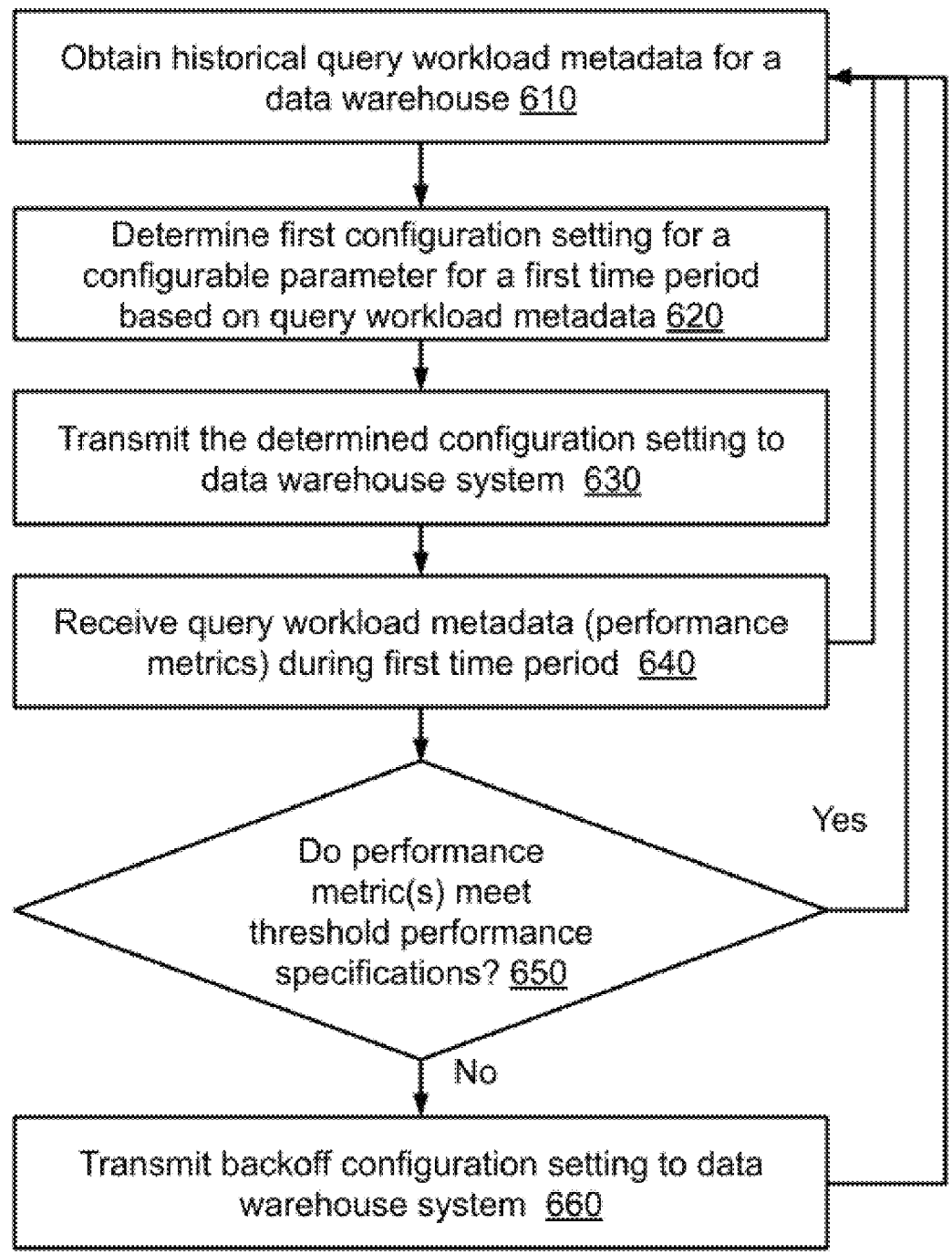
FIG. 6 depicts an example method to configure a data warehouse system, in accordance with some implementations.

FIG. 6 depicts an example method to configure a data warehouse system, in accordance with some implementations.

In some implementations, method 600 can be implemented, for example, on configuration management system 110 described with reference to FIG. 1. In some implementations, some or all of the method 600 can be implemented on one or more enterprise systems 120, on cloud computing system 130, as shown in FIG. 1, and/or on a combination of the systems. In the described examples, the implementing system includes one or more digital processors or processing circuitry ("processors"), and one or more storage devices. In some implementations, different components of one or more distributed computing systems (e.g., cloud based systems), servers and/or clients can perform different blocks or other parts of the method 600. In some examples, a first device is described as performing blocks of method 600. Some implementations can have one or more blocks of method 600 performed by one or more other devices (e.g., other client devices or server devices) that can send results or data to the first device.

In some implementations, the method 600, or portions of the method, can be initiated automatically by a system. In some implementations, the implementing system is a first device. For example, the method (or portions thereof) can be periodically performed, or performed based on one or more particular events or conditions, e.g., receipt of an indication from the data cloud/data warehouse system, reception of performance metric data, reception of events, notifications, and/or messages from a cloud computing system, at a predetermined time, a predetermined time period having expired since the last performance of method 600, and/or one or more other conditions or events occurring which can be specified in settings read by the method.

In some implementations, method 600 is performed for the first time (initialized) when one or more data warehouses are at their default configuration settings, which may be specified or suggested by a data warehouse system provider and/or an enterprise user. In some implementations, method 600 may be initialized by setting one or more data warehouses to their default configuration settings. For example, one configuration management system provider may replace a previously configured data warehouse, and it may be advantageous to initialize all settings to their default settings.

In some implementations, where performance enhancements may be prioritized over cost savings, one or more data warehouses may be set to configuration settings associated with high performance and high compute resource utilization. Continued performance of method 600 may enable the configuration management system to approach a state where the configuration settings are optimized for superior performance.

Processing may begin at block 610.

At block 610, historical query workload metadata associated with a data warehouse is obtained from the data warehouse system. In some implementations, the historical query workload metadata may be obtained for a plurality of data warehouses managed by a provider of configuration management services.

In some implementations, the historical query workload metadata is received as a log file that is pulled from a data warehouse system. In some other implementations, the historical query workload metadata may be received as a stream of data, which may be stored locally on a local device or on a cloud based device managed by the configuration management system.

In some implementations, the historical query workload metadata is obtained in a batch process, e.g., at a processor remote from the cloud storage system, or at a processor associated with a configuration management system. In some implementations, an Application Program Interface (API) may be utilized to obtain the historical query workload metadata.

In some implementations, obtaining historical query workload metadata is performed at a predetermined frequency, e.g., every 15 minutes, every 30 minutes, once a day, etc. In some implementations, the predetermined frequency may be selected based on a cost-performance tradeoff of accessing the data warehouse system to obtain the historical query workload metadata.

In some implementations, the historical query workload metadata is obtained such that it spans a duration of time whereby multiple, e.g., at least 2, instances of a time period of interest are included in the historical query workload metadata. For example, if a weekly schedule is being determined, historical query workload metadata is obtained such that the historical query workload metadata includes two successive time periods, e.g. for a determination of configuration settings for one or more configurable parameters for Monday: 9 am to 9:30 am, historical query workload metadata that spans at least 2 previous Monday: 9 am to 9:30 am, is obtained.

Smaller numbers (multiples) of instances of query workload metadata may be obtained for applications where recent patterns are to be prioritized, whereas larger multiples may be obtained for applications where stable patterns are to be prioritized. A degree of prioritization may be specified by an enterprise user as an index.

In some implementations, additional methods may be utilized to obtain historical query workload metadata, e.g., opportunistically running additional queries to gather more diverse metadata; generating by running sample runs, i.e., running pre-canned queries over test data; simulating based on the system understanding; generating new syntactically valid query templates and using them for obtained query metadata; and inferring the query metadata from some other system to the system under consideration.

In some implementations, obtaining the historical query workload metadata may include additional operations such as aggregation, normalization, etc.

Block 610 may be followed by block 620.

At block 620, a first configuration setting associated with a configurable parameter for the data warehouse is determined for a first time period based on an analysis of the historical query workload metadata. In some implementations, first configuration settings may be determined for one or more configurable parameters.

In some implementations, additional configuration settings may be determined for additional time periods. For example, the historical query workload metadata may include metadata that spans multiple time periods, and configuration settings may be determined for one or more configurable parameters for corresponding multiple time periods in the future.

In some implementations, the first time period may have a duration of about 30 minutes, and a first configuration setting may be based on historical query workload metadata associated with queries received during corresponding time periods.

In some implementations, configuration settings for multiple time periods may be generated and utilized to populate one or more of a weekly calendar, monthly calendar, next day calendar, etc. In some implementations, the calendar(s) may be displayed on a user interface or a dashboard to enable users to adjust the configuration settings.

In some implementations, the determination of the first configuration setting may be additionally based on a user, e.g., an enterprise user, specified aggressiveness index that is an indicator of a tradeoff of cost and performance for a particular data warehouse. For example, an enterprise user may operate multiple data warehouses that are managed by a configuration management system provider. Some of the data warehouses may be assigned a higher priority based on the type of data, type of queries, type and/or identity of user groups, and type and/or identity of applications that may utilize the output of the queries.

In some implementations, an indication of an aggressiveness index for one or more data warehouses may be received at the configuration management system via a user interface. For example, a slider may be utilized to enable a user to specify for a warehouse, an aggressiveness index that balances cost and performance. In some implementations, the user interface may utilize one or more of a slider, a specified number, e.g., a number between 0 and 1 that indicates a measure (degree) of the cost-performance tradeoff, a percentage, etc.

In some implementations, at least one of one or more configurable parameters may be a time interval (auto-suspend interval) after which a data warehouse that does not receive and/or process a query is automatically suspended (shutdown). Shutdown of a data warehouse may be advantageous to an enterprise user of the data warehouse system since they may be charged on the basis of a total time that a data warehouse is active (up), even if the data warehouse is in an idle and unutilized state.

In some implementations, a computer-implemented method to determine a first configuration setting when the configurable parameter is an auto-suspend interval may include determining a plurality of time intervals (gaps between queries) between the completion of a first query and an arrival of a succeeding query for all queries included in the historical query workload metadata.

In some implementations, a relatively short window of time may be utilized to determine the auto suspend interval setting. In some implementations, the configuration settings for an auto-suspend interval is determined based on about 15 minutes of historical query workload metadata. In some other implementations, the configuration settings for an auto-suspend interval is determined based on about 30 minutes of historical query workload metadata.

The gaps may be sorted, e.g., in an ascending order. A default affected (DA) number of queries is calculated based on a number of gaps between queries that exceed the default autosuspend interval to provide a baseline number of queries that would have been affected negatively (because the data warehouse was suspended, and had to be activated upon query arrival) by the default auto suspend interval.

An acceptable number of affected queries (AA) is determined based on the aggressiveness index and the default affected (DA) queries and utilized as a threshold number of affected queries, and is a number of queries with gaps in queries that are greater than the auto suspend interval. This enables a user, e.g., an enterprise user to select an operating point suitable for the data warehouse based on a cost-performance tradeoff. For example, a client user can control what fraction or factor of default affected queries is acceptable as a customized operating point, e.g., 0.2×, 0.5×, 2×, etc., via the aggressiveness slider. The position of the slider is utilized to determine the acceptable affected queries (AA), which in turn is utilized to determine the auto suspend interval setting.

In some implementations, the affected queries threshold is based on an aggressiveness index and a default affected queries threshold, and the default affected queries threshold is based on a number of affected queries associated with a default auto-suspend interval.

The auto-suspend interval (the first configuration setting) is set to the minimum auto-suspend interval that ensures that a number of affected queries meets an affected queries threshold, wherein an affected query is a query with an associated time interval that exceeds a corresponding auto-suspend interval.

In some implementations, a variability in arrival times of queries is modeled, and a window of observation of the historical query workload metadata may be adjusted accordingly.

In some implementations, at least one of one or more configurable parameters may be a warehouse size of a data warehouse. The warehouse size for a data warehouse setting is a measure of compute (processing resources, storage, etc.) resources provided for the data warehouse by the data warehouse system and has a direct bearing on processing speed of queries.

In some implementations, a duration of the historical query workload metadata utilized to determine an optimal configuration setting for a data warehouse size may correspond to a relatively longer duration of time, e.g., when compared to a duration utilized to determine an auto suspend interval. For example, the historical query workload metadata may be obtained that corresponds to a few weeks of metadata, e.g., 1 week, 2 weeks, 3 weeks, 4 weeks, 8 weeks, or periods that are between 1 week and 8 weeks.

In some implementations, the overall time window for which metadata is obtained is divided into smaller resizing time windows (W), e.g., of about 30 minutes duration. For example, for an overall processing time window selected for warehouse size determination with a duration of a week, 336 time windows of 30 minutes duration each may be considered.

In some implementations, the time window (resizing time window) size is determined based on a number of queries that are included in the time window. For example, the resizing time windows may be determined such that a number of received queries in each of the plurality of time windows meets a threshold number of received queries.

In some implementations, the resizing time window is the smallest time window that meets a threshold number of received queries. In some implementations, the resizing time window is the smallest time window that meets a threshold number of received queries as well as meets a threshold duration of time (to avoid/mitigate relatively small time periods for the resizing time window). For example, a resizing time window may be selected such that it includes at least 1000 received queries (i.e., received during the window in the historical query workload metadata), and is at least 15 minutes in duration.

In some implementations, the resizing time windows are all of the same duration, e.g., 30 minutes, 1 hour, 2 hours, etc. In some implementations, the resizing time windows may have different durations, based on a number of received queries in the corresponding time window, as included in the historical query workload metadata.

In some implementations, determining the warehouse size setting for the first time period includes determining a plurality of query latencies for queries included in the historical query workload metadata. For example, the historical query workload metadata may be analyzed to determine a number of queries received in the first time period, and a corresponding query latency for each query.

A threshold percentile latency may be determined for each time window from the plurality of query latencies based on a predetermined threshold percentile. For example, in some implementations, a 99th percentile of the plurality of query latencies received in a particular time window may be selected as the threshold percentile latency. In some other implementations, other threshold percentiles may be utilized, e.g., a 95th percentile, a 97th percentile, or any percentile between the 90th percentile and the 99th percentile.

For example, a time window specific threshold percentile latency ($W\_p$) is determined that corresponds to the predetermined threshold percentile of query latencies of the plurality of query latencies for queries that were processed (received at the data warehouse system) during a corresponding time window in the historical query workload metadata.

A reference threshold percentile latency ($Ref\_p$) is computed across all time windows based on an aggressiveness index and respective $W\_p$ computed over all resizing time windows. In some implementations, determining the reference threshold percentile latency can include determining the reference threshold percentile latency based on an aggressiveness index associated with the data warehouse, and wherein the aggressiveness index is received at the configuration management system via a user interface.

In some implementations, the reference threshold percentile latency is the (aggressiveness index)$^{th}$ percentile of all computed W_p.

For example, if the aggressiveness index is set at 0.5 (on a 0 to 1 scale), or 50% (on a percentage scale), the Ref_P is the 50th percentile of all computed W_p over all resizing time windows. In some implementations, the Ref_p is utilized to determine an adjustment of resource allocation for subsequent time periods based on a comparison of the time window specific threshold percentile latency with the Ref_p.

In some implementations, the first configuration setting for a warehouse size is set to a specified setting lower than the previous configuration setting if the time window specific threshold percentile latency for the first time period is less than the reference threshold percentile latency. The specified setting may be selected from a plurality of specified settings that may be permissible settings for the configurable parameter, e.g., data warehouse size.

In some implementations, the specified setting is selected to be the next lower setting of the plurality of specified settings. In some implementations, the specified setting may be determined based on a degree by which the time window specific threshold percentile latency is different from the reference threshold percentile latency.

In some implementations, at least one of one or more configurable parameters may be a maximum number of clusters per data warehouse. Clusters of data warehouses refer to duplicate instantiations of corresponding data warehouses that may be advantageous to process multiple queries received at a data warehouse. Processing queries in parallel may reduce a queue length at the data warehouse as well as reduce query latency.

In some implementations, a computer-implemented method to determine a number of warehouse clusters per data warehouse may include determining a plurality of query latencies for queries included in the historical query workload metadata.

In some implementations, the determination of a maximum number of warehouse clusters per data warehouse may be performed in conjunction with the determination of warehouse size, as described earlier. In some other implementations, the determination of a maximum number of warehouse clusters per data warehouse may be performed separately from the determination of warehouse size.

A threshold percentile latency may be determined for each time window from the plurality of query latencies based on a predetermined threshold percentile. For example, in some implementations, a 99th percentile of the plurality of query latencies received in a particular time window may be selected as the threshold percentile latency. In some other implementations, other threshold percentiles may be utilized, e.g., a 95th percentile, a 97th percentile, or any percentile between the 90th percentile and the 99th percentile.

For example, a time window specific threshold percentile latency (W_p) is determined that corresponds to the predetermined threshold percentile of query latencies of the plurality of query latencies for queries that were processed (received at the data warehouse system) during a corresponding time window in the historical query workload metadata.

A reference threshold percentile latency (Ref_p) is computed across all time windows based on an aggressiveness index and respective W_p computed over all resizing time windows. In some implementations, the reference threshold percentile latency is the (aggressiveness index)$^{th}$ percentile of all computed W_p.

A threshold percentile cluster count (C_p) is also determined for each time window based on a predetermined threshold percentile. For example, in some implementations, a 99th percentile of the plurality of cluster counts for queries received in a particular time window may be selected as the threshold percentile cluster count. In some other implementations, other threshold percentiles may be utilized, e.g., a 95th percentile, a 97th percentile, or any percentile between the 90th percentile and the 99th percentile.

Determination of the maximum number of warehouse clusters per data warehouse (the first configuration setting for the configurable parameter) is performed by comparing the W_p for the time window corresponding to the first time period and the Ref_p.

In some implementations, the first configuration setting (maximum cluster count) is determined by decrementing the time window specific threshold percentile cluster count by 1, if the time window specific threshold percentile latency determined for the first time period is less than the reference threshold percentile latency and setting the first configuration setting to the time window specific threshold percentile cluster count if the time window specific threshold percentile latency for the first time period is greater than or equal to the reference threshold percentile latency.

In some implementations, the decrementing by 1 may be replaced by a decrement that is based on a degree of the difference of the time window specific threshold percentile latency for the first time period and the reference threshold percentile latency.

In some implementations, the first configuration setting for any of the configurable settings may be associated with a lower resource utilization, e.g., computing resource usage, at the data warehouse system when compared to a previous configuration setting. For example, if the first configuration setting is associated with an auto-suspend interval as the configuration parameter, the first configuration setting may be set to a lower level, e.g., smaller auto-suspend interval, than a previous configuration setting, thereby enabling a data warehouse or data warehouse cluster being configured to be suspended after a shorter time has elapsed after its last access/use, and enabling power savings, cost savings, etc.

In some implementations, the first configuration setting for the configurable settings represents an optimized setpoint that enables a lower resource utilization without sacrificing performance.

In some implementations, the first configuration setting for the configurable settings represents an optimized setpoint that is associated with a lower (reduced) compute resource utilization at the data warehouse system when compared to a previous configuration setting without causing a performance degradation that exceeds a threshold specified degradation.

In some implementations, the first configuration setting for any of the configurable settings may be associated with a different resource utilization, e.g., computing resource usage, at the data warehouse system when compared to a previous configuration setting. For example, if the first configuration setting is associated with an auto-suspend interval as the configuration parameter, the first configuration setting may be set to a different level, e.g., smaller auto-suspend interval or a larger auto-suspend interval than a previous configuration setting, thereby enabling a data warehouse or data warehouse cluster being configured to be suspended after a shorter time or larger time has elapsed after its last access/use, and enabling a different operating point for the computer system, e.g., with a higher computer resource utilization and higher performance such as with shorter queue lengths for queries, shorter query latencies, or at a lower computer resource utilization, e.g., fewer clusters per data warehouse, smaller warehouse size, etc.

In some implementations, the analysis of the historical query workload metadata is performed by applying the historical query workload metadata to a trained machine learning model and/or to a data learning model.

In some implementations, a cost savings of the data warehouse when operating at the first configuration setting may be determined when compared to operating at a previous configuration setting. In some implementations, the cost savings of the data warehouse may be displayed on a user interface of a user of the data warehouse, e.g., on a dashboard of a computing device associated with the configuration management system or the enterprise user.

Block 620 may be followed by block 630.

At block 630, the first configuration setting for the configurable parameter for the first time period may be transmitted to the data warehouse system. In some implementations, the first configuration setting for the first time period may be transmitted via an API provided by the data warehouse system. In some implementations, the first configuration setting for the first time period may be transmitted via a messaging service that is utilized to facilitate communication between the configuration management system and the data warehouse system.

In some implementations, the first configuration setting for the first time period may be transmitted via a web browser interface.

In some implementations, in response to the transmission of the first configuration setting, an acknowledgement and/or response may be received from the data warehouse system. For example, an execution of a command that causes a first configuration setting to be transmitted to the data warehouse system may receive a message or response from the data warehouse system that is indicative of a success or failure by the data warehouse system to apply the transmitted configuration setting.

In some implementations, subsequent to the transmission of the first configuration setting, the configuration management system may monitor responses received from the data warehouse system to verify that the transmitted configuration setting(s) have been applied correctly.

In some implementations, prior to the transmission of the first configuration setting to the data warehouse system, the configuration management system may additionally verify changes that have occurred since a last transmission of a configuration setting, and determine whether a configuration setting for any of the configurable parameters (external knobs) was updated, e.g., directly by an enterprise user, etc. This verification may be performed periodically, e.g., every 30 seconds, every minute, every 15 minutes, etc., or may be performed just prior to the transmission of an updated configuration setting, and is utilized as a confirmation that a user, e.g., enterprise user, did not separately update a configuration setting of the configurable parameter that is to be updated by transmission of the first configuration setting.

For example, an enterprise user may anticipate a heavy proposed query workload on one or more data warehouses, and may transmit an updated configuration setting for a configurable parameter. Since the query workload may not match historical data patterns, performance of the data warehouse may have been negatively affected by automatic transmission of the first configuration setting from the configuration management system.

The configuration settings could be transmitted via SQL commands, API calls, cron schedules, client-side executables, REST interface, or other model serving services.

In some implementations, a plurality of configuration settings may be transmitted to the data warehouse system. For example, a second configuration setting for a second time period may be transmitted to the data warehouse system at substantially the same time as the first configuration setting. This may be utilized in implementations where the data warehouse system supports a schedule of configuration settings and applies suitable settings based on a current time period. In implementations where such a schedule feature is not supported by the data warehouse system, configuration settings for a particular time period are transmitted to the data warehouse system at a time of commencement of the particular time period. In some implementations, the configuration settings for a particular time period may be transmitted at a predetermined time prior to the commencement of the particular time period to account for a transmission delay and/or delay in applying the configuration setting at the data warehouse system.

Block 630 may be followed by block 640.

At block 640, (second) query workload metadata is received (or obtained) from the data warehouse system during the first time period. In some implementations, the query workload metadata includes performance metrics, e.g., query length, query latency, etc. In some implementations, the query workload metadata includes a subset of the data fields that are included in the historical (first) query workload metadata, e.g., the metadata received at block 610. In some implementations, the received query workload metadata is similar in structure to the historical query workload metadata and is received for a time slice for the first time period.

In some implementations, the received query workload metadata includes query workload metadata that corresponds to a predetermined duration of time after the commencement of the time period. For example, query workload metadata may be received about 15 minutes after the commencement of a time period to enable a determination of changes in performance metrics after one or more configuration settings have been transmitted and/or applied to the data warehouse system.

In some implementations, time slice query workload metadata may be received/obtained at a predetermined frequency, e.g., every 15 minutes, every 30 minutes, every hour, etc. This may enable the configuration management system to monitor the performance on or more data warehouses.

In some implementations, the time slice query workload metadata is only received/obtained for time periods associated with one or more configuration setting changes. For example, time slice query workload metadata may not be received/obtained for a time period when configuration settings were not changed from previous configuration settings, and/or where the configuration management system was unable to perform successful verification of application of configuration setting changes by the cloud warehouse system.

Block 640 may be followed by block 650.

At block 650, it is determined based on the query workload metadata, whether the received performance metric(s) for the first time period meets predetermined (or settable) threshold performance specification(s).

The predetermined threshold performance specifications may include one or more of query queue length, a threshold percentile query latency, average query latency, etc. In some implementations, the performance metric(s) may include determination of a change to previously recorded performance metric(s).

If it is determined that the performance metric(s) for the first time period does not meet the threshold performance specifications, block 650 may be followed by block 660, else block 650 is followed by block 610.

At block 660, if it is determined that the query workload metadata for the first time period does not meet the threshold performance, a backoff configuration setting may be transmitted for the configurable parameter to the data warehouse system.

In some implementations, the backoff configuration settings is the previous configuration setting, e.g., the configuration setting that was associated with the configurable parameter prior to its change to the first configuration parameter, e.g., by block 630.

In some implementations, the backoff configuration setting is a determined value for the configurable parameter that has a value between the first configuration setting and the previous configuration setting. The value may be determined based on the received time slice query workload metadata, and a measure of a change in the performance metrics that is associated with the change on configuration settings.

In some implementations, the backoff configuration setting may be determined by a data learning model and may be based on configurable parameters that were adjusted at the particular time period, and the particular performance metrics.

In some implementations, where multiple configurable parameters were adjusted for a time period, backoff configuration settings may only be transmitted for a subset of the configurable parameters. The subset of the configurable parameters for which the backoff configuration settings are transmitted may be based on the particular configurable parameters that were changed that are likely to be related to detected changes in performance.

For example, if for a particular time period, an auto suspend interval and a warehouse size settings were both changed (e.g., whereby updated configuration settings were transmitted for a time period at block 630), and the time slice query workload metadata is indicative of a large increase in queue length, but without an increase in processing time of a query, a backoff configuration setting may only be transmitted for the auto suspend interval setting, e.g., by increasing it from a current setting.

Blocks 610-660 can be performed (or repeated) in a different order than described above and/or one or more steps can be omitted. For example, in some implementations, blocks 650-660 may be omitted, and in some implementations, the method may commence directly at block 620 based on previously obtained historical query workload metadata, or at block 630 based on previously determined settings for one or more configuration parameters.

In some implementations, blocks 610-660 may be performed periodically, e.g., every about 6 hours, every about 15 minutes, or every about 30 minutes, periodically based on time periods specified by a user, etc. In some implementations, the configuration settings may be autonomously applied (or caused to be applied) by the configuration management system.

Figure 7:
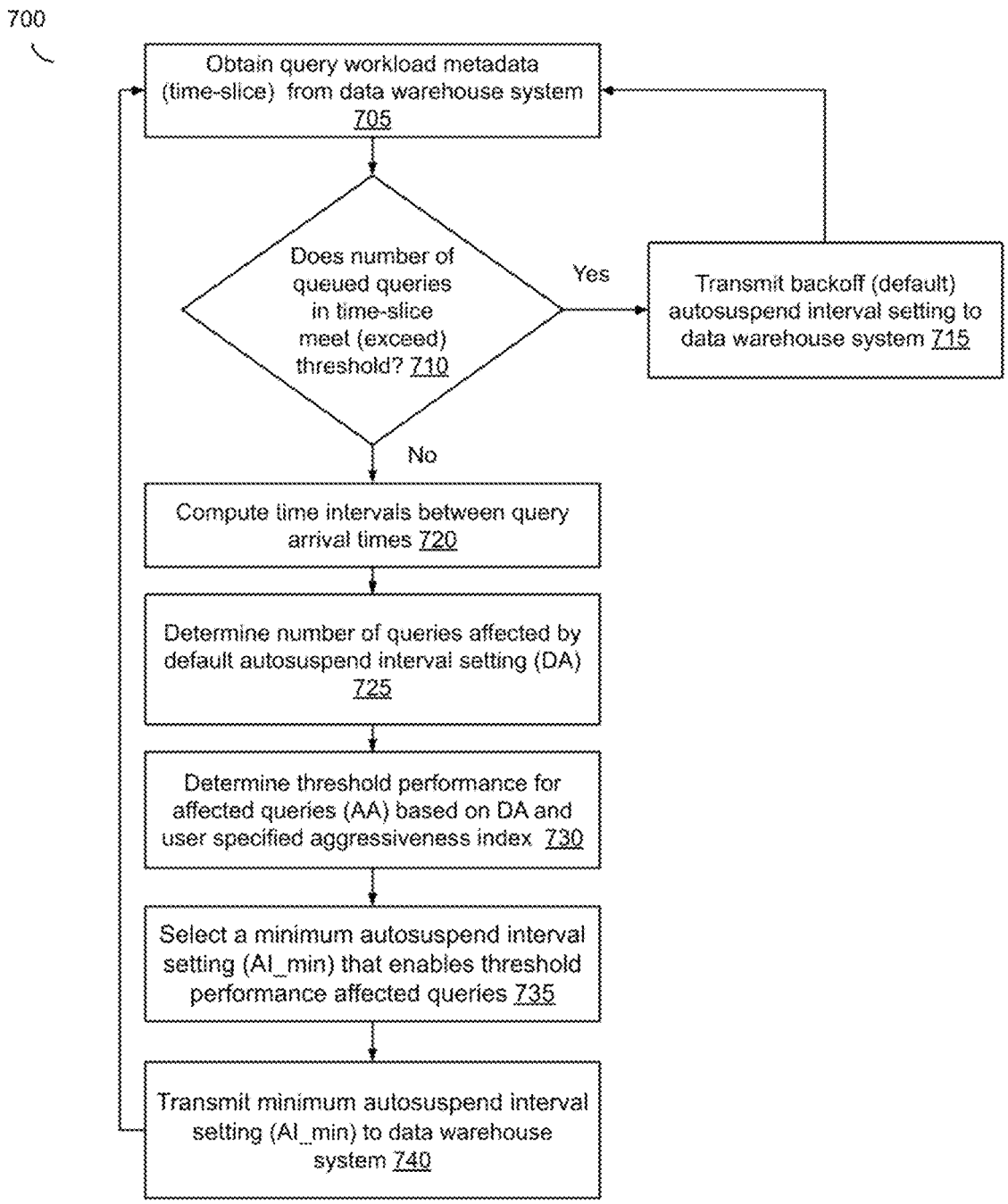
FIG. 7 depicts an example method to dynamically configure an auto suspend interval configuration setting for a data warehouse, in accordance with some implementations.

FIG. 7 depicts an example method to dynamically configure an auto suspend interval configuration setting for a data warehouse, in accordance with some implementations.

An AutoSuspend interval (auto suspend interval) setting controls how long a data warehouse is idle before it is suspended, i.e., users stop paying for it. When a new query arrives, a data cloud provider will wake up the data warehouse again. Lower AutoSuspend intervals reduce cost (since the data warehouse can enter a suspended state sooner after it enters an idle state), however it queues the queries that come immediately after (the data warehouse needs to be started again). Making this parameter dynamic, based on the workload, is clearly beneficial.

In some implementations, method 700 can be implemented, for example, on configuration management system 110 described with reference to FIG. 1. In some implementations, some or all of the method 700 can be implemented on one or more enterprise systems 120, on cloud computing system 130, as shown in FIG. 1, and/or on a combination of the systems. In the described examples, the implementing system includes one or more digital processors or processing circuitry ("processors"), and one or more storage devices. In some implementations, different components of one or more distributed computing systems (eg., cloud based systems), servers and/or clients can perform different blocks or other parts of the method 700. In some examples, a first device is described as performing blocks of method 700. Some implementations can have one or more blocks of method 700 performed by one or more other devices (e.g., other client devices or server devices) that can send results or data to the first device.

In some implementations, the method 700, or portions of the method, can be initiated automatically by a system. In some implementations, the implementing system is a first device. For example, the method (or portions thereof) can be periodically performed, or performed based on one or more particular events or conditions, e.g., receipt of an indication from the data cloud/data warehouse system, reception of performance metric data, reception of events, notifications, and/or messages from a cloud computing system, at a predetermined time, a predetermined time period having expired since the last performance of method 700, and/or one or more other conditions or events occurring which can be specified in settings read by the method.

Method 700 may begin at block 705.

At block 705, query workload metadata (time-slice) is obtained from the data warehouse system.

Block 705 is followed by block 710.

At block 710, it is determined whether a number of queued queries in the time-slice query workload metadata exceeds a predetermined threshold. The predetermined threshold may be set based on input received from a computing device associated with the enterprise computer system, or be set to a value determined by the configuration system. In some implementations, the predetermined threshold for a number of queued queries per data warehouse may be set to about 100. In some other implementations, the predetermined threshold for a number of queued queries per data warehouse may be set to about 1000. In some other implementations, the predetermined threshold for a number of queued queries per data warehouse may be set to a value between about 100 and about 1000.

If it is determined at block 710 that the number of queries exceeds the predetermined threshold, block 710 may be followed by block 715, else block 710 may be followed by block 720.

At block 715, a default or other backoff autosuspend interval setting is transmitted to the data warehouse system. Block 715 may be followed by block 705.

At block 720, time intervals (gaps) are computed between successive queries for all queries included in the query workload metadata. Block 720 may be followed by block 725.

At block 725, a number of queries affected by a default autosuspend interval setting (DA) is determined.

Block 725 may be followed by block 730.

At block 730, a threshold performance for affected queries (AA) is determined based on DA and a user specified aggressiveness index. Block 730 may be followed by block 735.

At block 735, a minimum autosuspend interval setting (AI_min) is selected that enables meeting of threshold performance for affected queries. Block 735 may be followed by block 740.

At block 740, the minimum autosuspend interval setting (AI_min) is transmitted to the data warehouse system. Block 740 may be followed by block 705.

Blocks 705-740 can be performed (or repeated) in a different order than described above and/or one or more steps can be omitted. For example, in some implementations, blocks 705-715 may be omitted, and in some implementations, the method may commence directly at block 720 based on previously obtained historical query workload metadata.

In some implementations, blocks 705-740 may be performed periodically, e.g., every about 15 minutes, or every about 30 minutes, periodically based on time periods specified by a user, etc. In some implementations, the configuration settings may be autonomously applied (or caused to be applied) by the configuration management system.

A specific example implementation to determine the auto suspend interval dynamically is provided herein.

1) Compute the time intervals, or gaps, between query arrival times
2) Sort the gaps in ascending order (G)
3) Calculate the number of queries affected by default autosuspend interval (AI_default)
   a) Default affected (DA)=number of gaps in G greater than the AI_default
4) Calculate the acceptable number of affected queries
   a) Acceptable affected (AA)=aggressiveness*DA
   b) Aggressiveness is a user configured slider between [0,1] to control the trade-off between performance and cost
5) Pick the minimum autosuspend interval (AI_min) that guarantees affected queries are no more than the acceptable number of affected queries
   a) Minimum autosuspend interval=the smallest gap value in G such that the number of gaps greater than that are at most AA
6) Run 1-5 every 15 min and set AutoSuspend interval to AI_min
7) Revert back AutoSuspend interval to AI_default if the number of queued queries in the last 15 mins is greater than a threshold.

Figure 8:
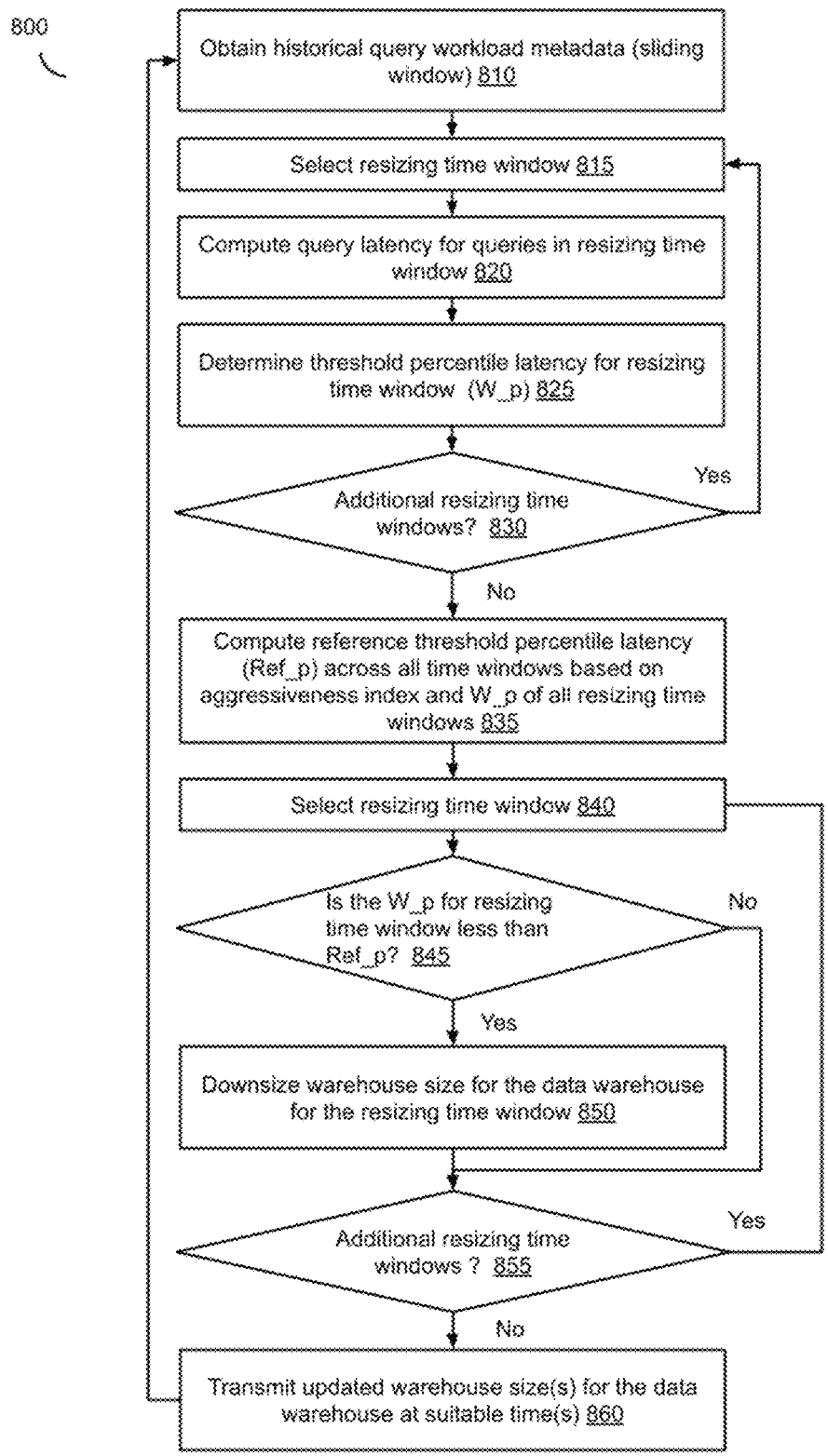
FIG. 8 depicts an example method to dynamically configure a warehouse size configuration setting for a data warehouse, in accordance with some implementations.

FIG. 8 depicts an example method to dynamically configure a warehouse size configuration setting for a data warehouse, in accordance with some implementations.

Warehouse size determines the amount of resources that are available for query processing. Data warehouses with larger sizes can process more complex queries efficiently, but they may also cost exponentially more money. Smaller sized data warehouses are most cost efficient but can slow down the query performance. The correct size depends on query workload needs at different points in time.

In some implementations, method 800 can be implemented, for example, on configuration management system 110 described with reference to FIG. 1. In some implementations, some or all of the method 800 can be implemented on one or more enterprise systems 120, on cloud computing system 130, as shown in FIG. 1, and/or on a combination of the systems. In the described examples, the implementing system includes one or more digital processors or processing circuitry ("processors"), and one or more storage devices. In some implementations, different components of one or more distributed computing systems (e.g., cloud based systems), servers and/or clients can perform different blocks or other parts of the method 800. In some examples, a first device is described as performing blocks of method 800. Some implementations can have one or more blocks of method 800 performed by one or more other devices (e.g., other client devices or server devices) that can send results or data to the first device.

In some implementations, the method 800, or portions of the method, can be initiated automatically by a system. In some implementations, the implementing system is a first device. For example, the method (or portions thereof) can be periodically performed, or performed based on one or more particular events or conditions, e.g., receipt of an indication from the data cloud/data warehouse system, reception of performance metric data, reception of events, notifications, and/or messages from a cloud computing system, at a predetermined time, a predetermined time period having expired since the last performance of method 800, and/or one or more other conditions or events occurring which can be specified in settings read by the method.

Method 800 may begin at block 810.

At block 810, historical query workload metadata is obtained from a data warehouse system on a sliding window basis. In some implementations, the historical query workload metadata may include historical query workload metadata corresponding to a few weeks of query workload metadata. For example, metadata for a first period of time may be obtained, wherein compared to a previous performance of method 800, recent metadata for a second period of time is added to the metadata while the earliest received data for a corresponding amount of time may be removed for the purpose of analysis.

Block 810 may be followed by block 815.

At block 815, a particular resizing time window is selected (or incremented). The resizing time window may be a shorter period of time compared to the time period for which the historical query workload metadata is obtained. A size (duration) for a resizing time window may be determined based on a threshold number of queries being received in the resizing time window and a minimum bound for duration of time for any resizing time window. For example, in some implementations, each resizing time window may be selected to be about 30 minutes.

Block 815 may be followed by block 820.

At block 820, query latencies are determined for queries included in the selected resizing time window. Block 820 may be followed by block 825.

At block 825, a threshold percentile latency is determined for queries received during the resizing time window. For example, a 99th percentile latency may be determined based on all query latencies recorded for queries received during the resizing time window. Alternative percentile values, e.g., 90%, 97%, 95%, percentiles between 90% and 99.99%, etc., may be utilized in different implementations.

Block 825 may be followed by block 830.

At block 830, it is determined whether there are additional resizing time windows in the query workload metadata. If it is determined that there are additional resizing time windows, the loop continues and block 830 is followed by block 815 with selection of the next resizing time window, else block 830 is followed by block 835.

At block 835, a reference threshold percentile latency (Ref_p) is determined across all time windows based on aggressiveness index and the threshold percentile latency (W_p) computed over all resizing time windows.

In some implementations, the reference threshold percentile latency is set to the (aggressiveness index)$^{th}$ percentile of all computed threshold percentile latencies (W_p).

Block 835 may be followed by block 840.

At block 840, a loop is performed over all resizing time windows to determine a suitable (optimized) warehouse size for each resizing time window. A next resizing time window is selected.

Block 840 may be followed by block 845.

At block 845, it is determined whether for the particular resizing time window, the threshold percentile latency is less than the reference threshold percentile latency. This determination can be considered to be a measure of a relative warehouse performance (as measured by query latency) for the data warehouse during that resizing time window when compared to an overall data warehouse performance, and may also be indicative of whether the particular resizing time window has a workload with fast intervals (query gaps) of queries or slow intervals (query gaps) of queries.

If it is determined that the threshold percentile latency is less than the reference threshold percentile latency, block 845 may be followed by block 850, else block 845 is followed by block 855.

At block 850, a warehouse size for the data warehouse for the resizing time window is downsized to a lower setting. In some implementations, the downsizing is performed in a sequential decreasing order (e.g., one step down at a time) of specified settings (e.g., settings supported by the data warehouse system), whereas in some other implementations, the downsizing is performed based on a degree of difference between the threshold percentile latency and the reference threshold percentile latency.

Block 850 may be followed by block 855.

At block 855, it is determined whether there are additional resizing time windows to be considered. If it is determined that there are additional resizing time windows to be considered, block 855 is followed by block 840 with selection of the next resizing time window, else block 855 may be followed by block 860.

At block 860, updated warehouse size(s) for the data warehouse are transmitted to the data warehouse system at suitable time(s).

In some implementations, at block 860, updated warehouse size(s) for the data warehouse are stored, and at a different time, suitable settings may be transmitted to the data warehouse system.

Blocks 810-860 can be performed (or repeated) in a different order than described above and/or one or more steps can be omitted. For example, in some implementations, blocks 820 may be performed prior to performance of block 815, and in some implementations, the method may commence directly at block 820 based on previously obtained historical query workload metadata.

In some implementations, blocks 810-860 may be performed periodically, e.g., every about 6 hours, every two hours, daily, periodically based on time periods specified by a user, etc. In some implementations, the configuration settings may be autonomously applied (or caused to be applied) by the configuration management system.

A specific example implementation to manage warehouse resizing dynamically is provided herein.

1) Users can enable dynamic resizing on specific warehouses (default resizing rule)
2) Users can also define specific non-overlapping intervals of time to enable dynamic resizing (additional resizing rule)
3) Users can also define different baselines (i.e., the starting size) for each of those dynamic sizing time intervals
4) Split each resizing rule into smaller time windows (W), such as 30 mins, over the course of a week, i.e., 336 maximum number of time windows possible.
5) Compute the p99 latency of each W over the past multiple weeks (W_p99).
6) Compute the reference latency (Ref_p) across all W_p99s
   a) Ref_p=Aggressiveness^th percentile of all W_p99s
7) Make a decision to downsize the warehouse in a time window W if its p99 latency is less than the reference latency, i.e., W_p99<Ref_p
8) Run 4-7 every 6 hours over a sliding window of query history to produce resizing decisions that consider recent history and yet evolve over time.
9) At a given time, check whether the current warehouse size is as per the optimized resizing schedule. Otherwise, don't do anything (customer made some changes)
10) Apply the resizing decision from non-default rule, if exists, otherwise apply default-rule resizing decision.
11) Revert back resizing decision to default if the number of queued queries in the last 15 mins is greater than a threshold.

Figure 9:
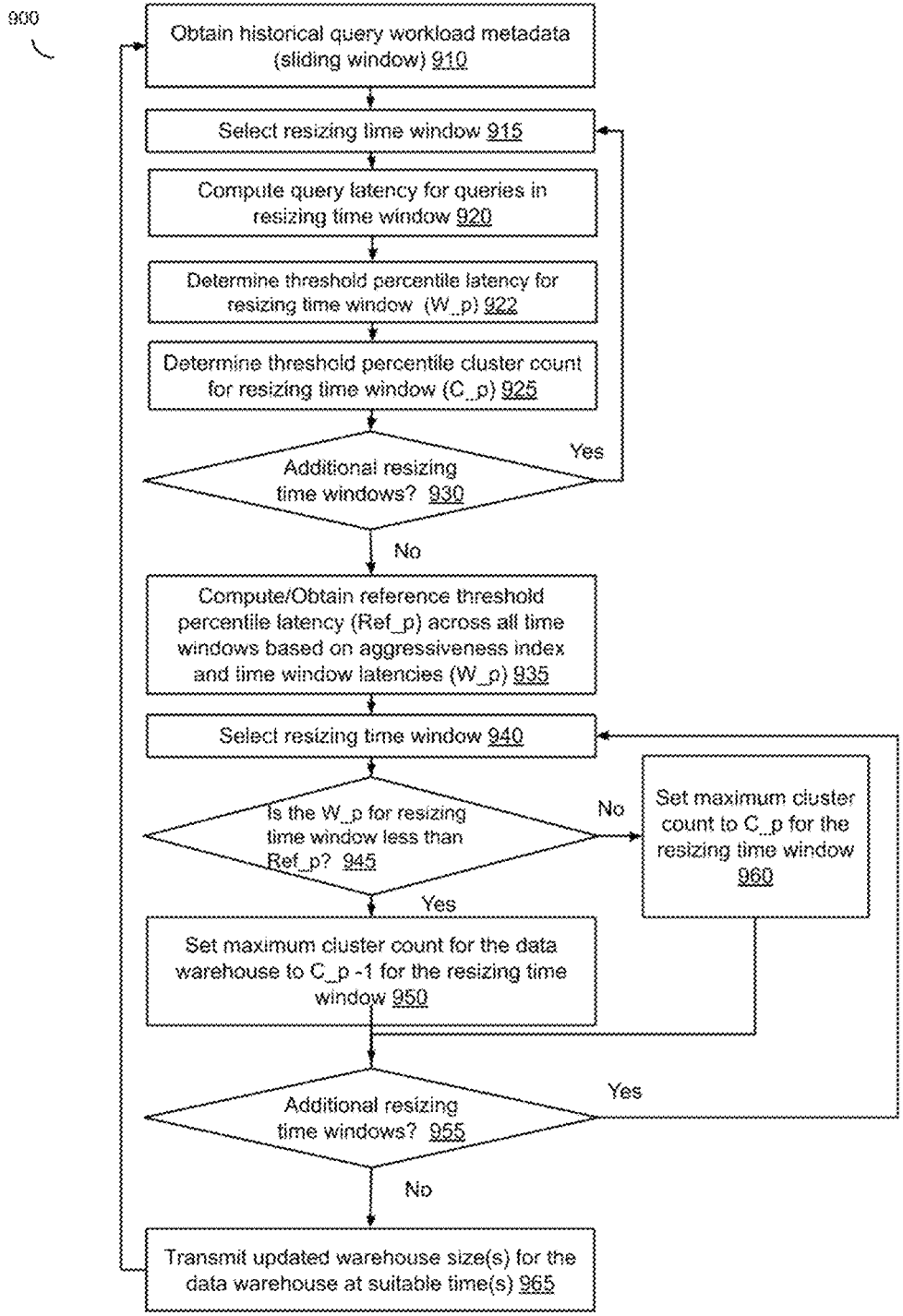
FIG. 9 depicts an example method to dynamically configure a number of warehouse clusters per warehouse configuration setting for a data warehouse, in accordance with some implementations.

FIG. 9 depicts an example method to dynamically configure a number of maximum warehouse clusters per warehouse configuration setting for a data warehouse, in accordance with some implementations.

Concurrent workloads can use multiple clusters to avoid having queries in the queue. Data clouds can automatically spin up more clusters in case of queued queries up to a maximum limit. Unfortunately, additional clusters increase the cost linearly. Lower number of clusters spinned up can reduce the cost but can have queries queued up longer.

In some implementations, method 900 can be implemented, for example, on configuration management system 110 described with reference to FIG. 1. In some implementations, some or all of the method 900 can be implemented on one or more enterprise systems 120, on cloud computing system 130, as shown in FIG. 1, and/or on a combination of the systems. In the described examples, the implementing system includes one or more digital processors or processing circuitry ("processors"), and one or more storage devices. In some implementations, different components of one or more distributed computing systems (e.g., cloud based systems), servers and/or clients can perform different blocks or other parts of the method 900. In some examples, a first device is described as performing blocks of method 900. Some implementations can have one or more blocks of method 900 performed by one or more other devices (e.g., other client devices or server devices) that can send results or data to the first device.

In some implementations, the method 900, or portions of the method, can be initiated automatically by a system. In some implementations, the implementing system is a first device. For example, the method (or portions thereof) can be periodically performed, or performed based on one or more particular events or conditions, e.g., receipt of an indication from the data cloud/data warehouse system, reception of performance metric data, reception of events, notifications, and/or messages from a cloud computing system, at a predetermined time, a predetermined time period having expired since the last performance of method 900, and/or one or more other conditions or events occurring which can be specified in settings read by the method.

Method 900 may begin at block 910.

At block 910, historical query workload metadata is obtained from a data warehouse system on a sliding window basis. In some implementations, the historical query workload metadata may include metadata corresponding to a few weeks of query workload metadata. For example, metadata for a first period of time may be obtained, wherein compared to a previous performance of method 900, recent metadata for a second period of time is added to the metadata while the earliest received data for a corresponding amount of time may be removed for the purpose of analysis.

Block 910 may be followed by block 915.

At block 915, a particular resizing time window is selected. The resizing time window may be a shorter period of time compared to the time period for which the historical query workload metadata is obtained. A size (duration) for a resizing time window may be determined based on a threshold number of queries being received in the resizing time window and a minimum bound for duration of time for any resizing time window. For example, in some implementations, each resizing time window may be selected to be about 30 minutes. For example, in some implementations, each resizing time window may be selected to be about 30 minutes.

Block 915 may be followed by block 920.

At block 920, query latencies of queries included in the selected resizing time window. Block 920 may be followed by block 925.

At block 925, a threshold percentile cluster count is determined for the selected resizing window.

Block 925 may be followed by block 930.

At block 930, it is determined whether there are additional resizing time windows. If it is determined that there are additional resizing time windows in the query workload metadata to be processed, block 930 is followed by block 915, else block 930 is followed by block 935.

At block 935, a reference threshold percentile latency (Ref_p) is determined across all time windows based on aggressiveness index and the threshold percentile latency (W_p) computed over all resizing time windows.

In some implementations, the reference threshold percentile latency is set to the (aggressiveness index)$^{th}$ percentile of all computed threshold percentile latencies (W_p).

Block 935 may be followed by block 940.

At block 940, a loop is performed over all resizing time windows to determine optimized maximum cluster count for each resizing time window. A next resizing time window is selected.

Block 940 may be followed by block 945.

At block 945, it is determined whether for the particular resizing time window, the threshold percentile latency is less than the reference threshold percentile latency. This determination can be considered to be a measure of a relative warehouse performance (as measured by query latency) for the data warehouse during that resizing time window when compared to an overall warehouse performance, and may also be indicative of whether the particular resizing time window has a workload with fast or slow intervals of queries.

If it is determined that the threshold percentile latency is less than the reference threshold percentile latency, block 945 may be followed by block 950, else block 945 is followed by block 960.

At block 950, the maximum cluster count for the data warehouse is set to the threshold percentile cluster count for resizing time window decremented by a predetermined number to obtain an optimized cluster count for the resizing time window. In some implementations, the threshold percentile cluster count for resizing time window is decremented by 1 to obtain the optimized cluster count for the resizing time window.

In some other implementations, the optimized cluster count for the resizing time window may be determined by decrementing the threshold percentile cluster count by a value that is based on a degree of difference between the threshold percentile latency for the particular resizing time window and the reference threshold percentile latency.

Block 950 may be followed by block 955.

At block 960, the maximum cluster count for the data warehouse is set to the threshold percentile cluster count determined (e.g., at block 925) for the particular resizing time window. Block 960 may be followed by block 955.

At block 955, it is determined whether there are additional resizing time windows to be considered. If it is determined that there are additional resizing time windows to be considered, block 955 is followed by block 940 with selection of the next resizing time window, else block 955 may be followed by block 965.

At block 965, updated maximum cluster count(s) for the data warehouse are transmitted to the data warehouse system at suitable time(s).

Block 965 may be followed by block 910.

Blocks 910-965 can be performed (or repeated) in a different order than described above and/or one or more steps can be omitted. For example, in some implementations, blocks 920 may be performed prior to performance of block 915, and in some implementations, the method may commence directly at block 920 based on previously obtained historical query workload metadata.

In some implementations, some of the determined parameters may be previously calculated, e.g., Ref_p and W_p for each resizing window may be obtained from corresponding calculations performed during the determination of warehouse size, e.g., as described with reference with method 800 and FIG. 8.

In some implementations, method 800 and method 900 may be performed at least partially in parallel.

In some implementations, blocks 910-965 may be performed periodically, e.g., every about 6 hours, every two hours, daily, periodically based on time periods specified by a user, etc. In some implementations, the configuration settings may be autonomously applied (or caused to be applied) by the configuration management system.

A specific example implementation to determine maximum cluster counts dynamically is provided herein.
1) Users define a maximum number of clusters (C_max) per warehouse or use the default value provided by the data cloud.
2) Align the max cluster decisions with the resizing decisions since they are interdependent
3) Compute an optimized max cluster count (C_opt) per resizing window W 4) Compute the p99 of the cluster number (C_p99) for all queries in W
5) Set the optimized cluster count to C_p99 or lower depending upon its relative p99 latency across all time windows, i.e.,
   a) Copt=C_p99−1 If W_p99<Ref_p99
   b) Copt=C_p99 Otherwise
6) Run 2-5 every 6 hours over a sliding window of query history to produce max cluster count decisions that consider recent history and yet evolve over time.
7) At a given time, check whether the current cluster count is as per the optimized schedule. Otherwise, don't do anything (customer made some changes)
8) Apply the optimized cluster count decision from non-default rule, if exists, otherwise apply default-rule cluster count decision.
9) Revert back cluster count to default if the number of queued queries in the last 15 mins is greater than a threshold.

Figure 10:
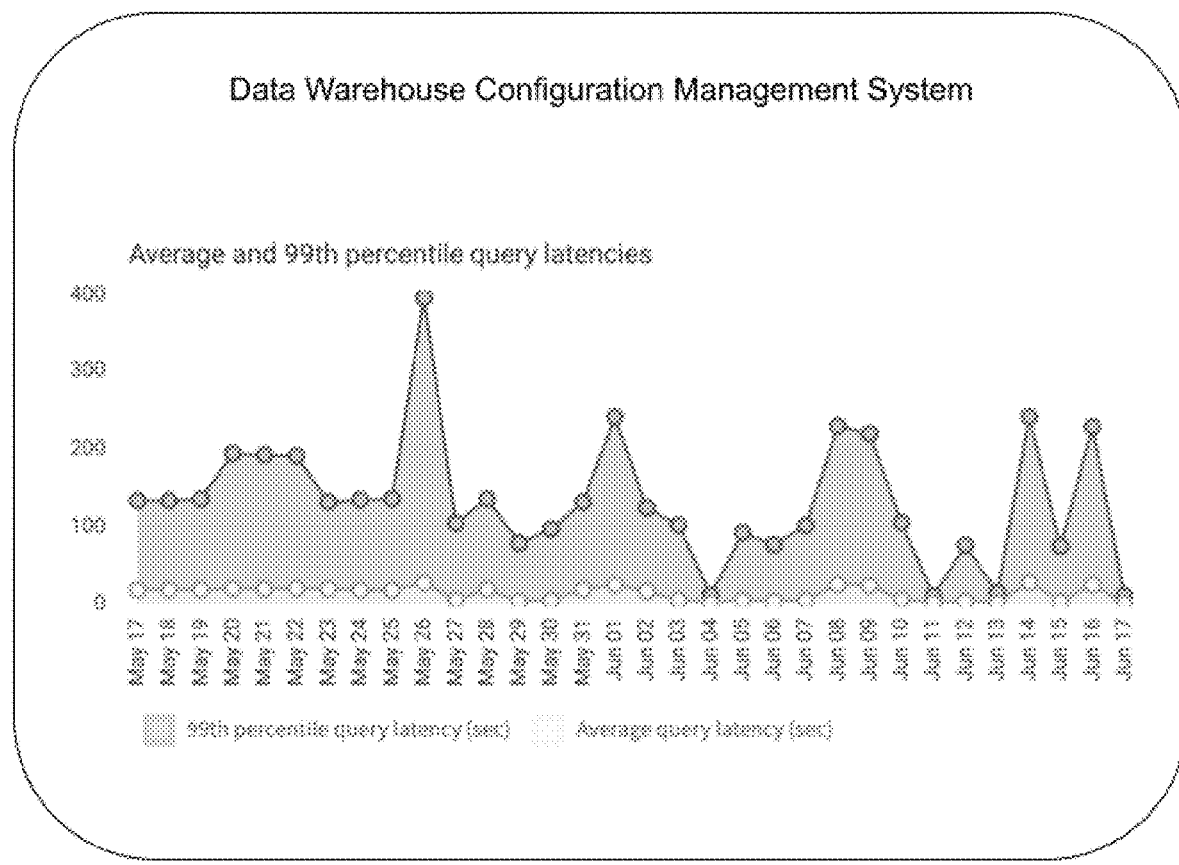
FIG. 10 depicts an example screenshot of a user interface of a configuration management (managed tuning) system.

FIG. 10 depicts an example screenshot of a user interface of a configuration management (managed tuning) system.

In this illustrative example, average and 99th percentile query latencies are displayed as a function of time for an example data warehouse. The 99th percentile query latency values may be utilized for the tuning of one or more configuration settings for configurable parameters.

Figure 11:
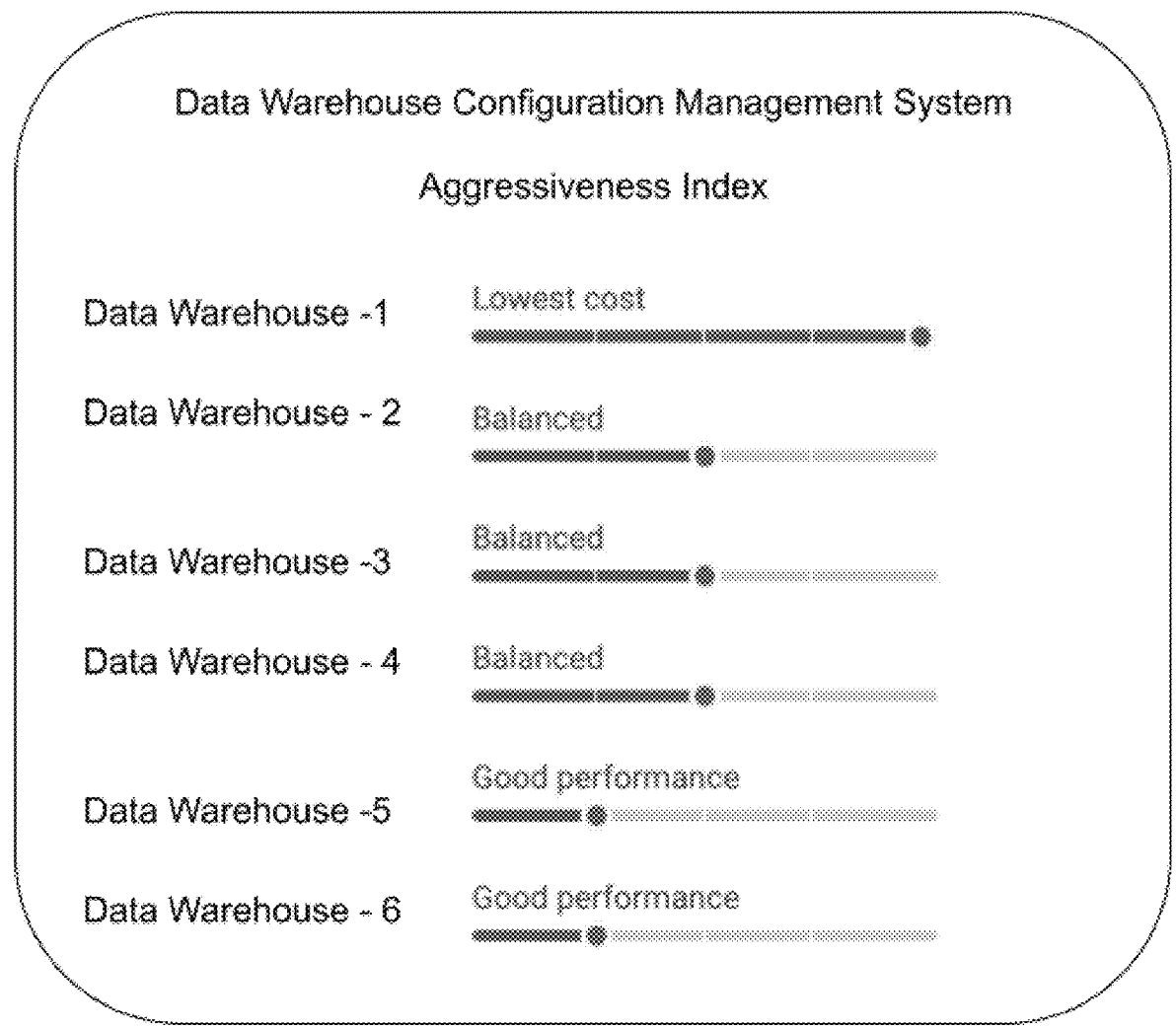
FIG. 11 depicts another example screenshot of a user interface of a configuration management (managed tuning) system.

FIG. 11 depicts another example screenshot of a user interface of a configuration management (managed tuning) system.

In this illustrative example, an aggressiveness index is depicted for example data warehouses. A slider may be utilized, e.g., by an enterprise user to specify an aggressiveness index for one or more data warehouses. Suitable levels may be provided for time critical query applications, and for query applications which are not time sensitive, but where cost optimization is preferred.

Figure 12:
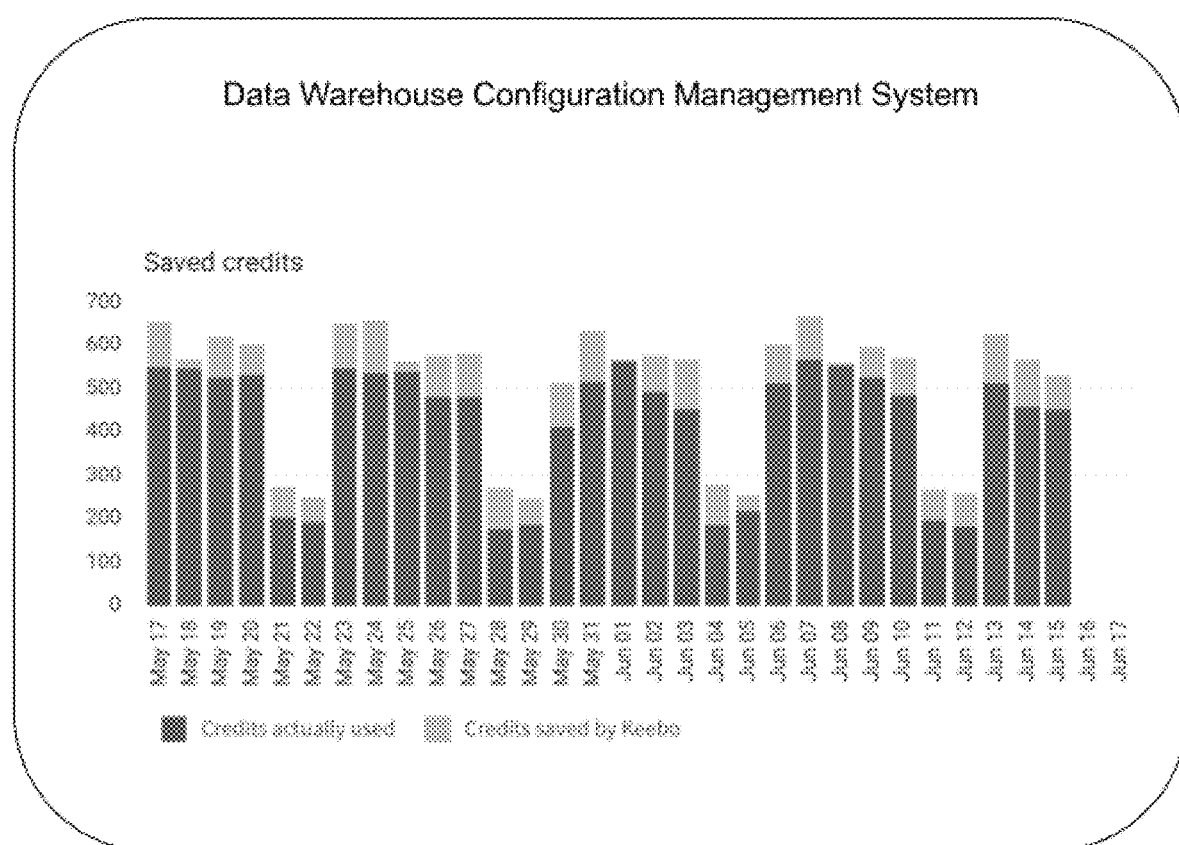
FIG. 12 depicts another example screenshot of a user interface of a configuration management (managed tuning) system.

FIG. 12 depicts another example screenshot of a user interface of a configuration management (managed tuning) system.

In this illustrative example, credits (compute resource usage) actually consumed by one or more data warehouses after managed tuning is applied, e.g., by the transmission, by the configuration management system, of one or more configuration settings for one or more configurable parameters.

Credits that would have been utilized based on default configuration settings are also displayed, along with the savings of credits due to the managed timing service provided by the configuration management system. In some implementations, a pricing model may be utilized whereby a portion of the saved credits is charged as a service fee by providers of the configuration management system.

Figure 13:
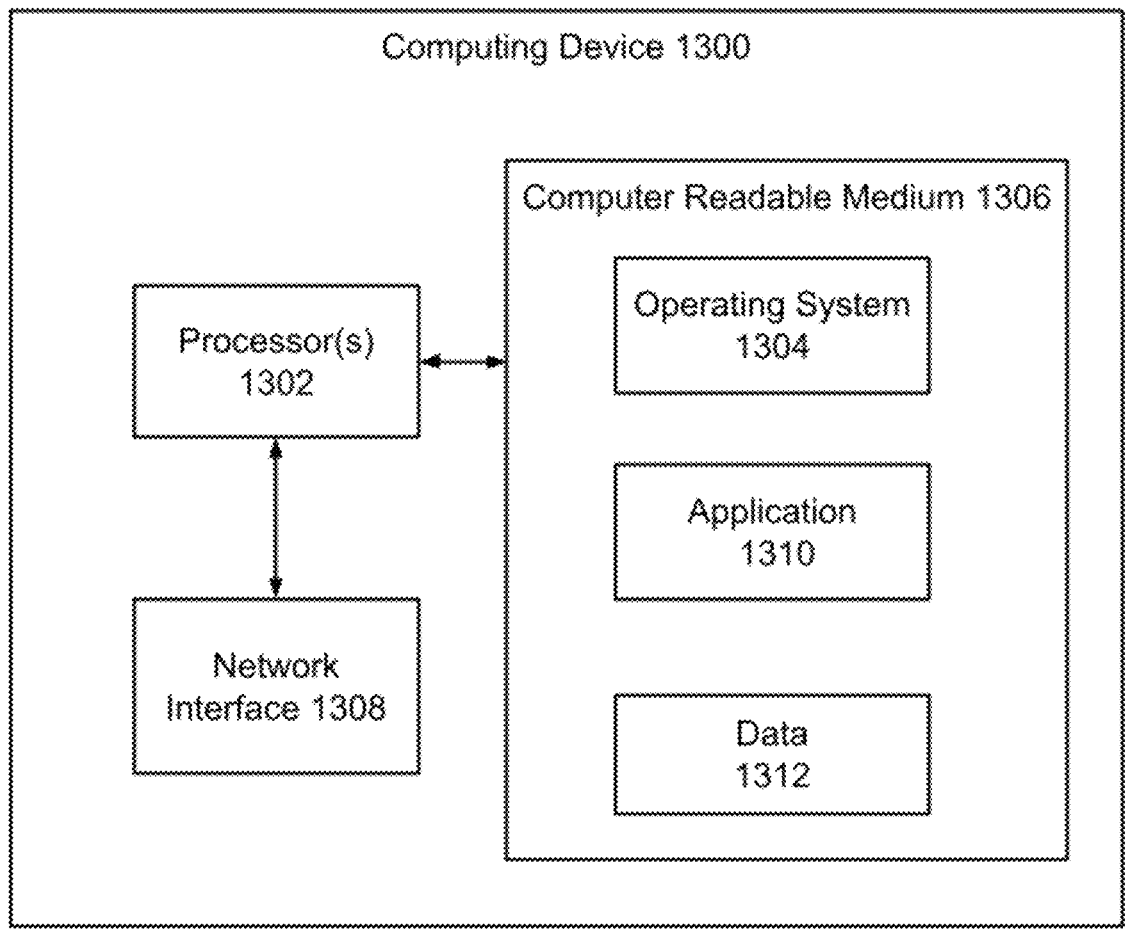
FIG. 13 depicts an example computing device, in accordance with some implementations.

FIG. 13 depicts an example computing device, in accordance with some implementations.

FIG. 13 is a block diagram of an example computing device 1300 which may be used to implement one or more features described herein. In one example, device 1300 may be used to implement a computer device (e.g. 110, 120, 130, 140, and/or 150 of FIG. 1), and perform appropriate method implementations described herein. Computing device 1300 can be any suitable computer system, server, or other electronic or hardware device. For example, the computing device 1300 can be a an compute resource on a cloud, a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 1300 includes a processor 1302, a memory or computer readable medium 1306, and network (input/output (I/O)) interface 1308.

Processor 1302 can be one or more processors and/or processing circuits to execute program code and control basic operations of the device 1300. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Computer readable medium (memory) 1306 is typically provided in device 1300 for access by the processor 1302, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1302 and/or integrated therewith. Memory 1306 can store software operating on the device 1300 by the processor 1302, including an operating system 1304, one or more applications 1310 and application data 1312. In some implementations, application 1310 can include instructions that enable processor 1302 to perform the functions (or control the functions of) described herein, e.g., some or all of the methods described with respect to FIGS. 5, 6, 7, 8, and 9.

Elements of software in memory 1306 can alternatively be stored on any other suitable storage location or computer-readable medium. In addition, memory 1306 (and/or other connected storage device(s)) can store instructions and data used in the features described herein. Memory 1306 and any other type of storage (magnetic disk, optical disk, magnetic tape, or other tangible media) can be considered "storage" or "storage devices."

A network or I/O interface can provide functions to enable interfacing the server device 1300 with other systems and devices. For example, network communication devices, storage devices, and input/output devices can communicate via the interface. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 13 shows one block for each of processor 1302 and memory 1306. These blocks may represent one or more processors or processing circuitries, operating systems, memories, I/O interfaces, applications, and/or software engines. In other implementations, device 1300 may not have all of the components shown and/or may have other elements including other types of elements instead of, or in addition to, those shown herein. While the processing system 130 is described as performing operations as described in some implementations herein, any suitable component or combination of components of processing system 130 or similar system, or any suitable processor or processors associated with such a system, may perform the operations described.

A user device can also implement and/or be used with features described herein. Example user devices can be computer devices including some similar components as the device 1300, e.g., processor(s) 1302, memory 1306, etc. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices, for example, can be connected to (or included in) the device 1300 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g. methods 500, 600, 700, 800, and/or 900) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices. In another example, all computations can be performed on a distributed computing system, e.g., a cloud based computing system.

Although the description has been described with respect to particular implementations thereof, these particular implementations are merely illustrative. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to configure a data warehouse system, comprising:
   obtaining, by a configuration management system, historical query workload metadata associated with a data warehouse from the data warehouse system;
   determining, based on the historical query workload metadata, a predictive schedule that includes a first configuration setting associated with a configurable parameter for a first time period, wherein the first time period is a future time period, and wherein the first configuration setting is associated with a lower computing resource utilization at the data warehouse system when compared to a previous configuration setting, wherein the configurable parameter is an auto-suspend interval, and wherein determining the first configuration setting for the auto-suspend interval for the first time period comprises:
   determining a plurality of time intervals between a time of completion of a first query and a time of arrival of a second query that immediately follows the first query for queries included in the historical query workload metadata; and
   setting the first configuration setting to a minimum auto-suspend interval whereby a number of affected queries meets an affected queries threshold, wherein an affected query is a query with an associated time interval that exceeds a corresponding auto-suspend interval;
   transmitting, to the data warehouse system, the first configuration setting for the configurable parameter;
   receiving, from the data warehouse system, during the first time period, query workload metadata;
   determining, based on the query workload metadata, whether the query workload metadata meets a threshold performance; and
   based on a determination that the query workload metadata does not meet the threshold performance, transmitting a backoff configuration setting for the configurable parameter to the data warehouse system.

2. The computer-implemented method of claim 1, wherein the affected queries threshold is based on an aggressiveness index and a default affected queries threshold, and wherein the default affected queries threshold is based on a number of affected queries associated with a default autosuspend interval.

3. The computer-implemented method of claim 1, further comprising receiving at the configuration management system via a user interface, an aggressiveness index for one or more data warehouses that includes the data warehouse.

4. The computer-implemented method of claim 1, wherein the backoff configuration setting is the previous configuration setting.

5. The computer-implemented method of claim 1, wherein the backoff configuration setting is a determined value for the configurable parameter that lies between the first configuration setting and the previous configuration setting.

6. The computer-implemented method of claim 1, further comprising determining a cost savings of the data warehouse when operating at the first configuration setting when compared to operating at the previous configuration setting.

7. The computer-implemented method of claim 6, further comprising displaying, on a user interface of a user of the data warehouse, the cost savings of the data warehouse.

8. The computer-implemented method of claim 1, further comprising:
  determining a second configuration setting for a second time period; and
  transmitting, to the data warehouse system and prior to commencement of the second time period, the second configuration setting.

9. The computer-implemented method of claim 8, wherein at least one of the first configuration setting and the second configuration setting is associated with a lower computing resource usage when compared to the previous configuration setting.

10. A computer-implemented method to configure a data warehouse system, comprising:
  obtaining, by a configuration management system, historical query workload metadata associated with a data warehouse from the data warehouse system;
  determining, based on the historical query workload metadata, a predictive schedule that includes a first configuration setting associated with a configurable parameter for a first time period, wherein the first time period is a future time period, wherein the first configuration setting is associated with a lower computing resource utilization at the data warehouse system when compared to a previous configuration setting, wherein the configurable parameter is a warehouse size for a data warehouse, and wherein determining the first configuration setting for the warehouse size for the first time period comprises:
    determining a plurality of query latencies for queries included in the historical query workload metadata;
    determining a plurality of time window specific threshold percentile latencies that correspond to a predetermined threshold percentile of query latencies of the plurality of query latencies for queries that were processed by the data warehouse system during a corresponding time window of a plurality of time windows in the historical query workload metadata;
    determining a reference threshold percentile latency that is based on a predetermined threshold percentile of the plurality of time window specific threshold percentile latencies; and
    setting the first configuration setting to a specified setting of a plurality of specified settings if the time window specific threshold percentile latency for the first time period is less than the reference threshold percentile latency, wherein the specified setting is lower than the previous configuration setting;
  transmitting, to the data warehouse system, the first configuration setting for the configurable parameter;
  receiving, from the data warehouse system, during the first time period, query workload metadata;
  determining, based on the query workload metadata, whether the query workload metadata meets a threshold performance; and
  based on a determination that the query workload metadata does not meet the threshold performance, transmitting a backoff configuration setting for the configurable parameter to the data warehouse system.

11. The computer-implemented method of claim 10, wherein a number of received queries in each of the plurality of time windows meets a threshold number of received queries.

12. The computer-implemented method of claim 10, further comprising receiving at the configuration management system via a user interface, an aggressiveness index for one or more data warehouses that includes the data warehouse.

13. A computer-implemented method to configure a data warehouse system, comprising:
  obtaining, by a configuration management system, historical query workload metadata associated with a data warehouse from the data warehouse system;
  determining, based on the historical query workload metadata, a predictive schedule that includes a first configuration setting associated with a configurable parameter for a first time period, wherein the first time period is a future time period, wherein the first configuration setting is associated with a lower computing resource utilization at the data warehouse system when compared to a previous configuration setting, wherein the configurable parameter is a maximum number of warehouse clusters per data warehouse, and wherein determining the first configuration setting for the first time period comprises:
  determining a plurality of time window specific threshold percentile maximum cluster counts that correspond to a predetermined threshold percentile of maximum cluster counts for queries that were processed by the data warehouse system during a corresponding time window in the historical query workload metadata;
  determining a plurality of query latencies for queries included in the historical query workload metadata;
  determining a plurality of time window specific threshold percentile latencies that correspond to a predetermined threshold percentile of query latencies of the plurality of query latencies for queries that were processed by the data warehouse system during a corresponding time window in the historical query workload metadata;
  determining a reference threshold percentile latency that is based on a predetermined threshold percentile of the plurality of time window specific threshold percentile latencies; and
  determining the first configuration setting by:
    decrementing the time window specific threshold percentile maximum cluster count if the time window specific threshold percentile latency for the first time period is less than the reference threshold percentile latency; and
setting the first configuration setting to the time window specific threshold percentile maximum cluster count if the time window specific threshold percentile latency for the first time period is greater than or equal to the reference threshold percentile latency;
  transmitting, to the data warehouse system, the first configuration setting for the configurable parameter;
  receiving, from the data warehouse system, during the first time period, query workload metadata;
  determining, based on the query workload metadata, whether the query workload metadata meets a threshold performance; and
  based on a determination that the query workload metadata does not meet the threshold performance, transmitting a backoff configuration setting for the configurable parameter to the data warehouse system.

14. The computer-implemented method of claim 13, wherein determining the reference threshold percentile latency further comprises determining the reference threshold percentile latency based on an aggressiveness index associated with the data warehouse, and wherein the aggressiveness index is received at the configuration management system via a user interface.

15. A non-transitory computer-readable medium comprising instructions that, responsive to execution by a processing device, causes the processing device to perform operations comprising:
  obtaining historical query workload metadata associated with a data warehouse from a data warehouse system;
  determining, based on the historical query workload metadata, a predictive schedule that includes a first configuration setting associated with a configurable parameter for a first time period, wherein the first time period is a future time period, wherein the first configuration setting is associated with a different computing resource utilization at the data warehouse system when compared to a previous configuration setting, wherein the configurable parameter is an auto-suspend interval, and wherein determining the first configuration setting for the auto-suspend interval for the first time period comprises:
    determining a plurality of time intervals between query arrival times for queries included in the historical query workload metadata; and
    setting the first configuration setting to a minimum auto-suspend interval of a plurality of specified auto-suspend intervals whereby a number of affected queries meets an affected queries threshold, wherein an affected query is a query with an associated time interval that exceeds a corresponding auto-suspend interval of the plurality of specified auto-suspend intervals;
  transmitting, to the data warehouse system, the first configuration setting for the configurable parameter;
  receiving, from the data warehouse system, during the first time period, query workload metadata;
  determining, whether the query workload metadata meets a threshold performance; and
  based on a determination that the query workload metadata does not meet the threshold performance, transmitting a backoff configuration setting for the configurable parameter to the data warehouse system.

16. The non-transitory computer-readable medium of claim 15, wherein the backoff configuration setting is a determined value for the configurable parameter that lies between the first configuration setting and the previous configuration setting.

17. The non-transitory computer-readable medium of claim 15, wherein the configurable parameter further comprises a warehouse size for the data warehouse, and wherein determining the first configuration setting for the warehouse size for the first time period comprises:
  determining a plurality of query latencies for queries included in the historical query workload metadata;
  determining a plurality of time window specific threshold percentile latencies that correspond to a predetermined threshold percentile of query latencies of the plurality of query latencies for queries that were processed by the data warehouse system during a corresponding time window in the historical query workload metadata;
  determining a reference threshold percentile latency that is based on a predetermined threshold percentile of the plurality of time window specific threshold percentile latencies; and
  setting the first configuration setting to a specified setting of a plurality of specified settings if the time window specific threshold percentile latency for the first time period is less than the reference threshold percentile latency, wherein the specified setting is lower than the previous configuration setting.

18. A system comprising:
  a memory with instructions stored thereon; and
  a processing device, coupled to the memory, the processing device configured to access the memory and execute the instructions, wherein the instructions cause the processing device to perform operations including:
    obtaining historical query workload metadata associated with a data warehouse from a data warehouse system;
    determining, based on the historical query workload metadata, a predictive schedule that includes a first configuration setting associated with a configurable parameter for a first time period, wherein the first time period is a future time period, wherein the first configuration setting is associated with a different computing resource utilization at the data warehouse system when compared to a previous configuration setting, wherein the configurable parameter is a number of warehouse clusters for the data warehouse, and wherein determining the first configuration setting for the first time period comprises:
      determining a plurality of time window specific threshold percentile maximum cluster counts that correspond to a predetermined threshold percentile of maximum cluster counts for queries that were processed by the data warehouse system during a corresponding time window in the historical query workload metadata;
      determining a plurality of query latencies for queries included in the historical query workload metadata;
      determining a plurality of time window specific threshold percentile latencies that correspond to a predetermined threshold percentile of query latencies of the plurality of query latencies for queries that were processed by the data warehouse system during a corresponding time window in the historical query workload metadata;
      determining a reference threshold percentile latency that is based on a predetermined threshold percentile of the plurality of time window specific threshold percentile latencies; and
      determining the first configuration setting by:
        decrementing the time window specific threshold percentile maximum cluster count if the time window specific threshold percentile latency for the first time period is less than the reference threshold percentile latency; and setting the first configuration setting to the time window specific threshold percentile maximum cluster count if the time window specific threshold percentile latency for the first time period is greater than or equal to the reference threshold percentile latency;

transmitting, to the data warehouse system, the first configuration setting for the configurable parameter;

receiving, from the data warehouse system, during the first time period, query workload metadata;

determining, whether the query workload metadata meets a threshold performance; and based on a determination that the query workload metadata does not meet the threshold performance, transmitting a backoff configuration setting for the configurable parameter to the data warehouse system.

19. The system of claim 18, wherein the backoff configuration setting is the previous configuration setting.

20. The system of claim 18, wherein the operations further comprise receiving, via a user interface, an aggressiveness index for one or more data warehouses that includes the data warehouse.

* * * * *